United States Patent
Masumoto et al.

(10) Patent No.: US 12,191,904 B2
(45) Date of Patent: Jan. 7, 2025

(54) BURST OPTICAL RELAYING DEVICE AND BURST OPTICAL RELAYING METHOD

(71) Applicant: Nippon Telegraph and Telephone Corporation, Tokyo (JP)

(72) Inventors: Kana Masumoto, Musashino (JP); Masahiro Nakagawa, Musashino (JP); Toshiya Matsuda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 108 days.

(21) Appl. No.: 17/918,020

(22) PCT Filed: May 11, 2020

(86) PCT No.: PCT/JP2020/018803
§ 371 (c)(1),
(2) Date: Oct. 10, 2022

(87) PCT Pub. No.: WO2021/229634
PCT Pub. Date: Nov. 18, 2021

(65) Prior Publication Data
US 2023/0155673 A1 May 18, 2023

(51) Int. Cl.
*H04B 10/00* (2013.01)
*H04B 10/032* (2013.01)

(52) U.S. Cl.
CPC ................ *H04B 10/032* (2013.01)

(58) Field of Classification Search
CPC .................................................. H04B 10/032
USPC ............................................................ 398/5
See application file for complete search history.

(56) References Cited

U.S. PATENT DOCUMENTS

| 6,975,811 B1 * | 12/2005 | Kakizaki | H04Q 11/0062 |
| | | | 398/5 |
| 7,319,816 B2 * | 1/2008 | Satou | H04B 10/071 |
| | | | 398/21 |
| 8,090,257 B2 * | 1/2012 | Nishioka | H04J 14/0284 |
| | | | 398/20 |

FOREIGN PATENT DOCUMENTS

JP 2003046456 A * 2/2003 ............. H04B 17/00

OTHER PUBLICATIONS

Lee et al., "All-optical gain-clamped EDFA using external saturation signal for burst-mode upstream in TWDM-PONs," Optics Express, Jul. 2014, 22(15): 9 pages.

(Continued)

*Primary Examiner* — Kenneth N Vanderpuye
*Assistant Examiner* — Mohammad R Sedighian
(74) *Attorney, Agent, or Firm* — Fish & Richardson P.C.

(57) ABSTRACT

A relay device (39bA) includes an optical signal return unit (50a) and a detection unit (55b). When an optical signal input via one optical transmission line (41) of two optical transmission lines (41 and 42) with a double-ring configuration has not been detected for a predetermined time or longer, the detection unit (55b) outputs a disconnection signal of the optical transmission line. The optical signal return unit (50a) is configured to, only when there is an input of the disconnection signal, return to one of the optical transmission lines (41) only a clamp beam that has been sent from a representative node via the other optical transmission line (42) in the direction opposite to the optical signal input via the one of the optical transmission lines (41).

9 Claims, 15 Drawing Sheets

(56) References Cited

OTHER PUBLICATIONS

Masumoto et al., "The usefulness evaluation of metro node configuration for suppressing transient response on burst amplification," IEICE technical report, 2020, 119(365):27-32, 13 pages (with English Translation).

* cited by examiner

BURST OPTICAL RELAYING DEVICE AND BURST OPTICAL RELAYING METHOD

CROSS-REFERENCE TO RELATED APPLICATIONS

This application is a National Stage application under 35 U.S.C. § 371 of International Application No. PCT/JP2020/018803, having an International Filing Date of May 11, 2020.

The disclosure of the prior application is considered part of the disclosure of this application, and is incorporated by reference in its entirety into this application.

TECHNICAL FIELD

The present invention relates to a burst beam relay device used in a node of a metro network that is applied to a rural area in which areas with a low traffic demand are scattered, for example, and a burst beam relay method.

BACKGROUND ART

As a network for flexibly concentrating metro networks in a rural area with an accommodation traffic of several tens of Gbps, for example, at a low cost and with low power, an optical TDM (Time Division Multiplexing) network (FIG. 9) to which the optical TDM technique is applied has been studied. In such an optical TDM network, a burst optical signal with controlled timing is used as a main signal. Further, in the optical TDM network, an EDFA (Erbium Doped optical Fiber Amplifier) as an optical amplifier for addressing burst is needed to cover the transmission distance for a metro network in which transmission over a long distance of several hundreds of Km, for example, is performed in multiple stages.

In an optical TDM network 10 illustrated in FIG. 9, optical fibers are laid in a double-ring shape, forming a double-ring configuration of an outer optical transmission line 11 as an outer ring and an inner optical transmission line 12 as an inner ring. A plurality of optical couplers 14a, 14b, 14c, and 14d are connected to the outer optical transmission line 11 at predetermined intervals. Likewise, a plurality of optical couplers 15a, 15b, 15c, and 15d are connected to the inner optical transmission line 12 at predetermined intervals.

An optical signal is transmitted through the outer optical transmission line 11 in a clockwise direction as indicated by the arrow Y1, and an optical signal is transmitted through the inner optical transmission line 12 in a counterclockwise direction as indicated by the arrow Y2. In the outer optical transmission line 11, EDFAs 16a and 16b are connected to the respective input sides of the optical couplers 14c and 14d. In the inner optical transmission line 12 also, EDFAs 17a and 17b are connected to the respective input sides of the optical couplers 15c and 15d.

A burst TRX (transceiver) 18a, which serves as a transceiver for sending and receiving an optical signal with data superposed thereon, is connected to the optical coupler 14a connected to the outer optical transmission line 11 and to the optical coupler 15a connected to the inner optical transmission line 12 via optical fibers. With the burst TRX 18a and the optical couplers 14a and 15a, a node 19a as a communication device is formed.

Likewise, a burst TRX 18b is connected to the optical couplers 14b and 15d via optical fibers. With the burst TRX 18b and the optical couplers 14b and 15d, a node 19b is formed. A burst TRX 18c is connected to the optical couplers 14c and 15c. With the burst TRX 18c and the optical couplers 14c and 15c, a node 19c is formed. A burst TRX 18d is connected to the optical couplers 14d and 15b. With the burst TRX 18d and the optical couplers 14d and 15b, a node 19d is formed.

Each of the burst TRXs 18a to 18d has a transmission device 20 connected thereto as represented by the burst TRX 18a. The transmission device 20 exchanges optical signals with the burst TRX 18a.

In such a configuration, it is assumed that the burst TRX 18b has sent a burst optical signal 1B with a wavelength $\lambda 1$ illustrated in a blowing frame 21a to the optical coupler 14b within a predetermined time period t1 as indicated by the arrow Y3. The sent burst optical signal 1B is transmitted through the outer optical transmission line 1 in a clockwise direction as indicated by the arrow Y1 via the optical coupler 14b, and is amplified by the EDFA 16a as indicated by the arrow Y4 and is then output to the optical coupler 14c.

It is also assumed that the burst TRX 18c has sent a burst optical signal 2B with a wavelength $\lambda 1$ illustrated in a blowing frame 21b within a predetermined time period t2 after the time period t1 has elapsed as indicated by the arrow Y5. The sent burst optical signal 2B is time-division multiplexed with the burst optical signal 1B by the optical coupler 14c, and the resulting signals are transmitted through the outer optical transmission line 11 in a clockwise direction. The transmitted burst optical signals 1B and 2B are amplified by the EDFA 16b and are then input to the optical coupler 14d.

Meanwhile, it is assumed that the burst TRX 18d has sent a burst optical signal 3B with a wavelength $\lambda 1$ illustrated in a blowing frame 21c within a predetermined time period t3 after the time period t2 has elapsed as indicated by the arrow Y6. The sent burst optical signal 3B is time-division multiplexed with the burst optical signals 1B and 2B by the optical coupler 14d as illustrated in a blowing frame 21d, and the resulting signals are transmitted through the outer optical transmission line 11 in a clockwise direction. The transmitted burst optical signals 1B to 3B are branched by the optical coupler 14a, for example, and are received by the burst TRX 18a and are then sent to the transmission device 20.

However, when the burst optical signals 1B and 2B are amplified by the aforementioned EDFAs 16a and 16b, overshoot occurs that would cause an increase in the degradation of transmission quality. Such occurrence of overshoot will be described using the EDFA 16a illustrated in FIG. 10 as a representative example. It is assumed that the burst optical signal 1B transmitted through the outer optical transmission line 11 is input to the EDFA 16a.

The EDFA 16a receives a pump beam 1P based on a laser beam from a pumping semiconductor laser (not illustrated). With the pump beam 1P, the burst optical signal 1B with a level L1 is amplified to a level L2. At the beginning of the amplification, a transient response occurs in the EDFA 16a so that overshoot with a level L3 occurs.

To suppress such overshoot, there is known a technique using a clamp beam 1C illustrated in FIG. 11 (Non-Patent Literature 1). Such a technique can be implemented with a suppressed cost since a general-purpose EDFA that has been already used is used.

As illustrated in FIG. 11, a CW (Continuous Wave) light source 23 is connected to an optical coupler 14b1 that is connected to the outer optical transmission line 11 in an inserted manner. The CW light source 23 sends to the optical coupler 14b1 the continuous-wave clamp beam 1C with a wavelength $\lambda 4$ different from that of the burst optical signal 1B. The optical coupler 14b1 synthesizes the clamp beam 1C with the burst optical signal 1B so that the non-signal sections of the burst optical signal 1B are eliminated.

The EDFA 16a amplifies the synthesized burst optical signal 1B and clamp beam 1C. In the amplification, as the power of the clamp beam 1C is higher than the power of the burst optical signal 1B, the percentage of the synthesized signals that are detected as a continuous signal by the EDFA 16a is increased. This can further suppress overshoot. The burst optical signal 1B and the clamp beam 1C amplified to a predetermined level L2 (FIG. 10) with the suppressed overshoot are input to a filter 24. The filter 24 removes the clamp beam 1C, and passes only the burst optical signal 1B with the wavelength λ1.

Such a technique of suppressing overshoot using a clamp beam has been fully studied for a PON (Passive Optical Network) with a passive star configuration. For a metro network, a configuration is applied in which the clamp beam 1C sent from the CW light source 23 is synthesized with the burst optical signal 1B immediately before the EDFA 16a in the double-ring configuration, and the clamp beam 1C is removed with the filter 24 immediately after the EDFA 16a as described above. In such a configuration, the components, such as the CW light source 23, the optical coupler 14b1, and the filter 24, are needed for each of a plurality of EDFAs arranged in each of a plurality of nodes of the double-ring. This results in increased resources of the metro network.

Thus, FIG. 12 illustrates the configuration of a burst beam relay system (also referred to as a system) applied to a metro network with reduced resources. A system 30 is based on the technique of Non-Patent Literature 2, and has a configuration in which a plurality of nodes 31a, 31b, 31c, and 31d are connected to a representative node 31 via an outer optical transmission line 41 and an inner optical transmission line 42 forming a double-ring, using the aforementioned optical TDM technique.

The representative node 31 has an active/auxiliary configuration including a primary node and a secondary node. The primary node includes transponders 33a each having a clamp light source 32a, a MUX (multiplexer) 34a, and a DEMUX (demultiplexer) 35a. The secondary node includes transponders 33b each having a clamp light source 32b, a MUX 34b, and a DEMUX 35b.

The node 31a includes a burst beam relay device (also referred to as a relay device) 39a and active/auxiliary transponders 37a and 37b. Likewise, the node 31b includes a relay device 39b and active/auxiliary transponders 37c and 37d, the node 31c includes a relay device 39c and active/auxiliary transponders 37e and 37f, and the node 31d includes a relay device 39d and active/auxiliary transponders 37g and 37h.

Since each of the nodes 31a to 31d does not require the components, such as the CW light source 23, the optical coupler 14b1, and the filter 24, used for each of the plurality of EDFAs illustrated in FIG. 11 described above, the amount of resources is reduced.

It should be noted that optical transmission lines (not illustrated) are respectively connected to the aforementioned transponders 33a, 33b, and 37a to 37h.

The output side of the MUX 34b of the secondary node and the input side of the DEMUX 35a of the primary node are connected through the outer optical transmission line 41 via each of the relay devices 39d, 39c, 39b, and 39a. An optical signal sent from the MUX 34b of the secondary node is transmitted through the outer optical transmission line 41, and is received by the DEMUX 35a of the primary node via each of the relay devices 39d, 39c, 39b, and 39a as indicated by the arrow Y11.

The output side of the MUX 34a of the primary node and the input side of the DEMUX 35b of the secondary node are connected through the inner optical transmission line 42 via each of the relay devices 39a, 39b, 39c, and 39d. An optical signal sent from the MUX 34a of the primary node is received by the DEMUX 35b of the secondary node via each of the relay devices 39a, 39b, 39c, and 39d as indicated by the arrow Y12.

Next, the configurations of the burst beam relay devices 39a to 39d will be described using the relay device 39b illustrated in FIG. 13 as a representative example. The relay device 39b includes optical couplers 44c and 44d and EDFAs 45c and 45d connected to the outer optical transmission line 41, and optical couplers 47c and 47d and EDFAs 48c and 48d connected to the inner optical transmission line 42.

The EDFA 45d, the optical couplers 44d and 44c, and the EDFA 45c are connected in this order to the outer optical transmission line 41 in the direction of the arrow Y11. The EDFA 48c, the optical couplers 47c and 47d, and the EDFA 48d are connected in this order to the inner optical transmission line 42 in the direction of the arrow Y12.

Further, the relay device 39b includes a buffer 46c1 connected between the transponder 37c and the optical coupler 44c, a buffer 46c2 connected between the optical coupler 47c and the transponder 37c, a buffer 46d1 connected between the transponder 37d and the optical coupler 47d, and a buffer 46d2 connected between the optical coupler 44d and the transponder 37d.

In the system 30 illustrated in FIG. 12 with such a configuration, for example, in the node 39d, a burst optical signal sent from the transponder 37g is transmitted to the outer optical transmission line 41, and is then received by the DEMUX 35a of the primary node as the representative node 31 as indicated by the arrow Y11a. Likewise, in the relay device 39b illustrated in FIG. 13, a burst optical signal sent from the transponder 37c passes through the buffer 46c1 and the optical coupler 44c and is amplified by the EDFA 45c, and is then transmitted through the outer optical transmission line 41 and is received by the DEMUX 35a of the primary node as indicated by the arrow Y11a. Further, the signal is received by each transponder 33a as indicated by the arrow Y11b.

Meanwhile, in the primary node illustrated in FIG. 12, a burst optical signal sent from the MUX 34a is transmitted to the inner optical transmission line 42 as indicated by the arrow Y12. The burst optical signal is amplified by the EDFA 48c illustrated in FIG. 13, for example, and is then branched by the optical coupler 47c. Then, one of the resulting signals is sent to the transponder 37c via the buffer 46c2, and the other is amplified by the EDFA 48d via the optical coupler 47d and is then sent to the DEMUX 35b of the secondary node via the inner optical transmission line 42. Then, the signal is received by each transponder 33b as indicated by the arrow Y12a.

The primary node and the secondary node are redundant nodes with an active/auxiliary configuration, and are configured such that one of them (for example, the primary node) is automatically switched to the other (i.e., the secondary node) to be selected upon occurrence of a failure. That is, each transponder 33a of the primary node and each transponder 33b of the secondary node are configured such that one of them is automatically switched to the other upon occurrence of a failure. Along with this, the transponder 37a and the transponder 37b of the node 39a are configured such that one of them is switched to the other. The same holds true for the other nodes 39b to 39d.

For the clamp light source 32b arranged in each transponder 33b of the secondary node, the aforementioned CW light source 23 (FIG. 11) is used. The clamp light source 32b sets the gain of a continuous-wave optical signal with a wavelength different from that of a burst optical signal to be constant, and sends the signal as a clamp beam as indicated by the arrow Y11b. The sent clamp beam is transmitted from the MUX 34b to the outer optical transmission line 41 in the direction indicated by the arrow Y11, and passes through each of the nodes 31d to 31a, and is then received by the DEMUX 35a of the primary node.

A clamp beam sent from the clamp light source 32a arranged in each transponder 33a of the primary node as indicated by the arrow Y12a is transmitted from the MUX 34a to the inner optical transmission line 42 in the direction indicated by the arrow Y12, and passes through each of the nodes 31a to 31d, and is then received by the DEMUX 35b of the secondary node.

It should be noted that the clamp beam that passes through the outer optical transmission line 41 or the inner optical transmission line 42 is removed with a filter as appropriate as described above.

In this manner, as a clamp beam is transmitted through the outer optical transmission line 41 or the inner optical transmission line 42, overshoot of a burst optical signal is suppressed.

CITATION LIST

Non-Patent Literature

Non-Patent Literature 1: H. H. Lee, et al., "All-optical gain-clamped EDFA using external saturation signal for burst-mode upstream in TWDM-PONs.", Optics Express 22.15 (2014).

Non-Patent Literature 2: Kana Masumoto, and three others. "Evaluation of usefulness of node configuration capable of suppressing transient response that occurs during burst beam amplification for metro networks," January, IEICE technical report, 2020.

SUMMARY OF THE INVENTION

Technical Problem

In the aforementioned system 30, suppose that a failure, such as disconnection of an optical fiber indicated by reference sign 1k, has occurred in the outer optical transmission line 41 between the node 31b and the node 31c illustrated in FIG. 14. In such a case, it becomes impossible for a burst optical signal and an optical signal of a clamp beam, which travel toward the primary node from the position of the failure 1k in the outer optical transmission line 41, to reach the nodes 31b and 31a.

Therefore, as illustrated in FIG. 15, since a clamp beam does not reach the EDFA 45c when a burst optical signal indicated by the arrow Y11a from the active transponder 37c is input to the EDFA 45c, it would be impossible to appropriately perform amplification while suppressing overshoot as indicated by a cross mark 2k.

When the aforementioned failure 1k has occurred, the configuration of the representative node 31 is switched to the auxiliary configuration so that an optical signal travels from the primary node to the secondary node via the inner optical transmission line 42 as indicated by the arrow Y12 in FIG. 14. In such a case, as illustrated in FIG. 15, an optical signal transmitted through the inner optical transmission line 42 is amplified by the EDFA 48c and is branched by the optical coupler 47c, and is then received by the active transponder 37c via the buffer 46c2 as indicated by the arrow Y12b.

Meanwhile, a burst optical signal sent from the auxiliary transponder 37d as indicated by the arrow Y12c is multiplexed with a clamp beam by the optical coupler 47d via the buffer 46d1, and is amplified by the EDFA 48d and is then transmitted to the secondary node via the inner optical transmission line 42.

However, since overshoot of a burst optical signal on the transmission side from the active transponder 37c indicated by the arrow Y11a is not appropriately suppressed as indicated by the cross mark 2k on the EDFA 45c, it would be impossible to use the burst optical signal. Meanwhile, since the auxiliary transponder 37d cannot receive an optical signal from the secondary node due to the occurrence of the failure 1k, it would be impossible to use the optical signal.

Therefore, when the configuration of the representative node 31 is switched to the auxiliary configuration in which an optical signal travels from the primary node to the secondary node as described above, communication cannot be performed properly even if the active transponder 37c is switched to the auxiliary transponder 37d in the node 31b. This also holds true for the other nodes 31a, 31c, and 31d. Therefore, even when the configuration of the representative node 31 is switched from the active primary node to the auxiliary secondary node, communication cannot be performed properly.

The present invention has been made in view of the foregoing circumstances, and it is an object of the present invention to, when a failure has occurred in one of optical transmission lines with a double-ring configuration, allow a burst optical signal to be sent to the other optical transmission line with suppressed overshoot.

Means for Solving the Problem

To solve the aforementioned problem, a burst beam relay device of the present invention includes an optical signal return unit connected to a representative node with an active/auxiliary configuration that sends and receives a burst optical signal and sends a continuous-wave clamp beam with a wavelength different from a wavelength of the burst optical signal, via two optical transmission lines with a double-ring configuration that perform optical transmission in mutually opposite directions, in a manner relaying the burst optical signal and an optical signal of the clamp beam, the optical signal return unit being connected across the two optical transmission lines in each of a plurality of nodes that sends and receives the burst optical signal; and a detection unit that, when an optical signal input via one of the two optical transmission lines has not been detected for a predetermined time or longer, outputs a disconnection signal of the optical transmission line to the optical signal return unit, in which only when there is an input of the disconnection signal, the optical signal return unit returns to the one of the optical transmission lines only a clamp beam that has been sent from the representative node via another optical transmission line in a direction opposite to the optical signal input via the one of the optical transmission lines.

Effects of the Invention

The present invention allows, when a failure has occurred in one of optical transmission lines with a double-ring configuration, a burst optical signal to be sent to the other optical transmission line with suppressed overshoot.

DESCRIPTION OF EMBODIMENTS

Hereinafter, an embodiment of the present invention will be described with reference to the drawings. It should be noted that throughout the drawings of this specification, functionally corresponding portions are denoted by identical reference signs, and the description thereof will be omitted as appropriate.

<Configuration of Embodiment>

Figure 1:
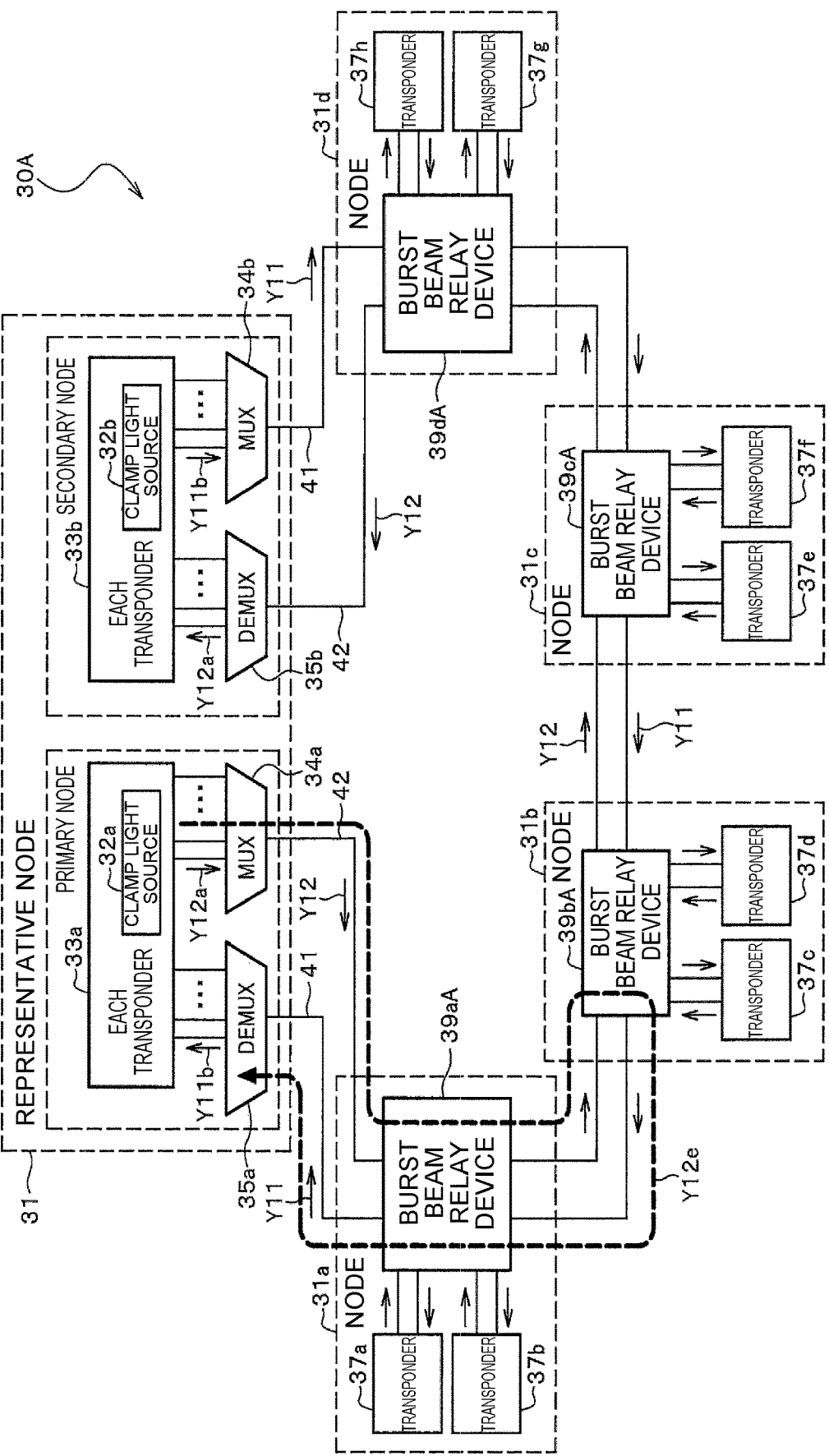
FIG. 1 is a block diagram illustrating the configuration of a burst beam relay system according to an embodiment of the present invention.

FIG. 1 is a block diagram illustrating the configuration of a burst beam relay system according to an embodiment of the present invention.

Figure 12:
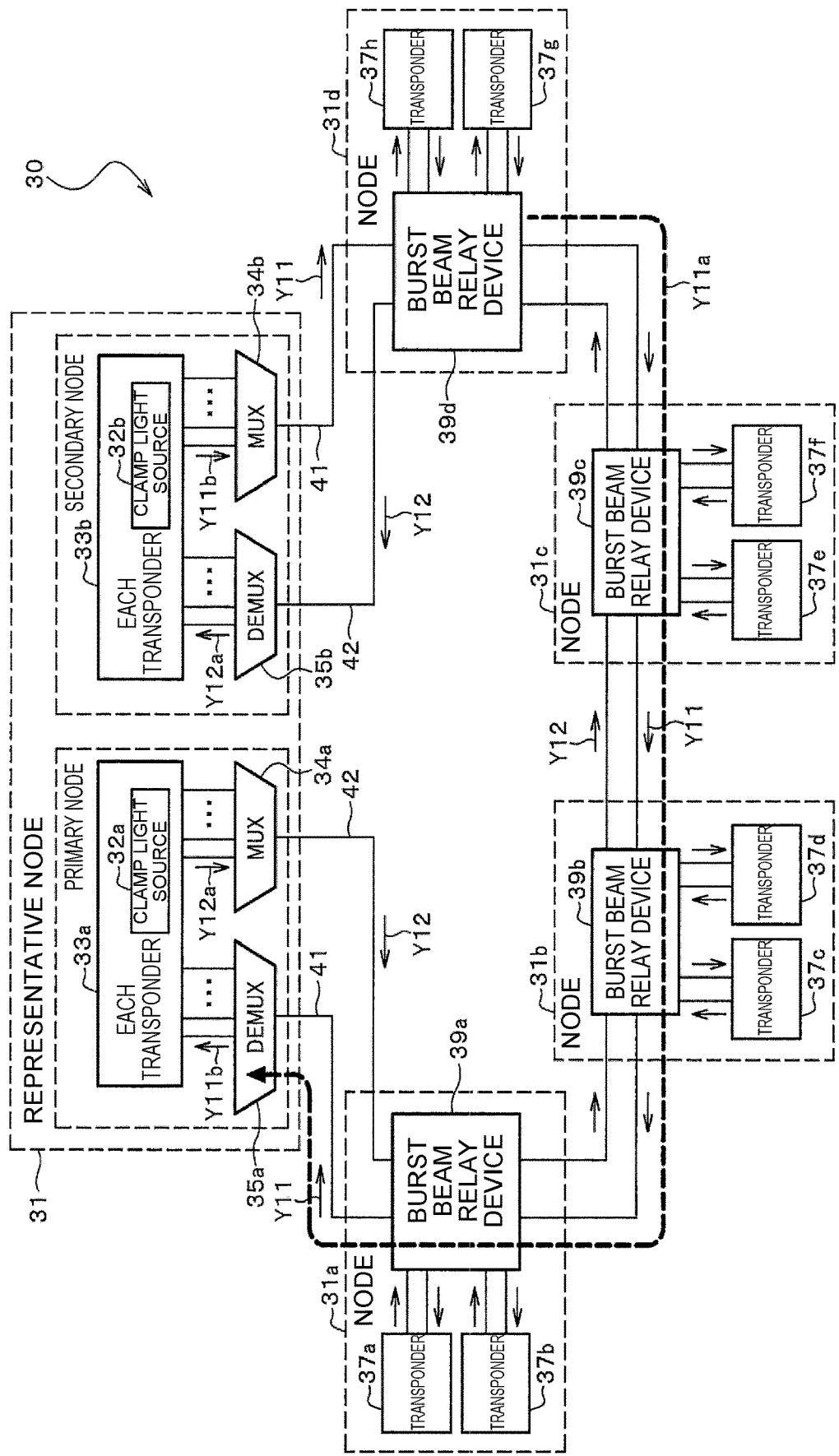
FIG. 12 is a block diagram illustrating the configuration of a conventional burst beam relay system.
Figure 13:
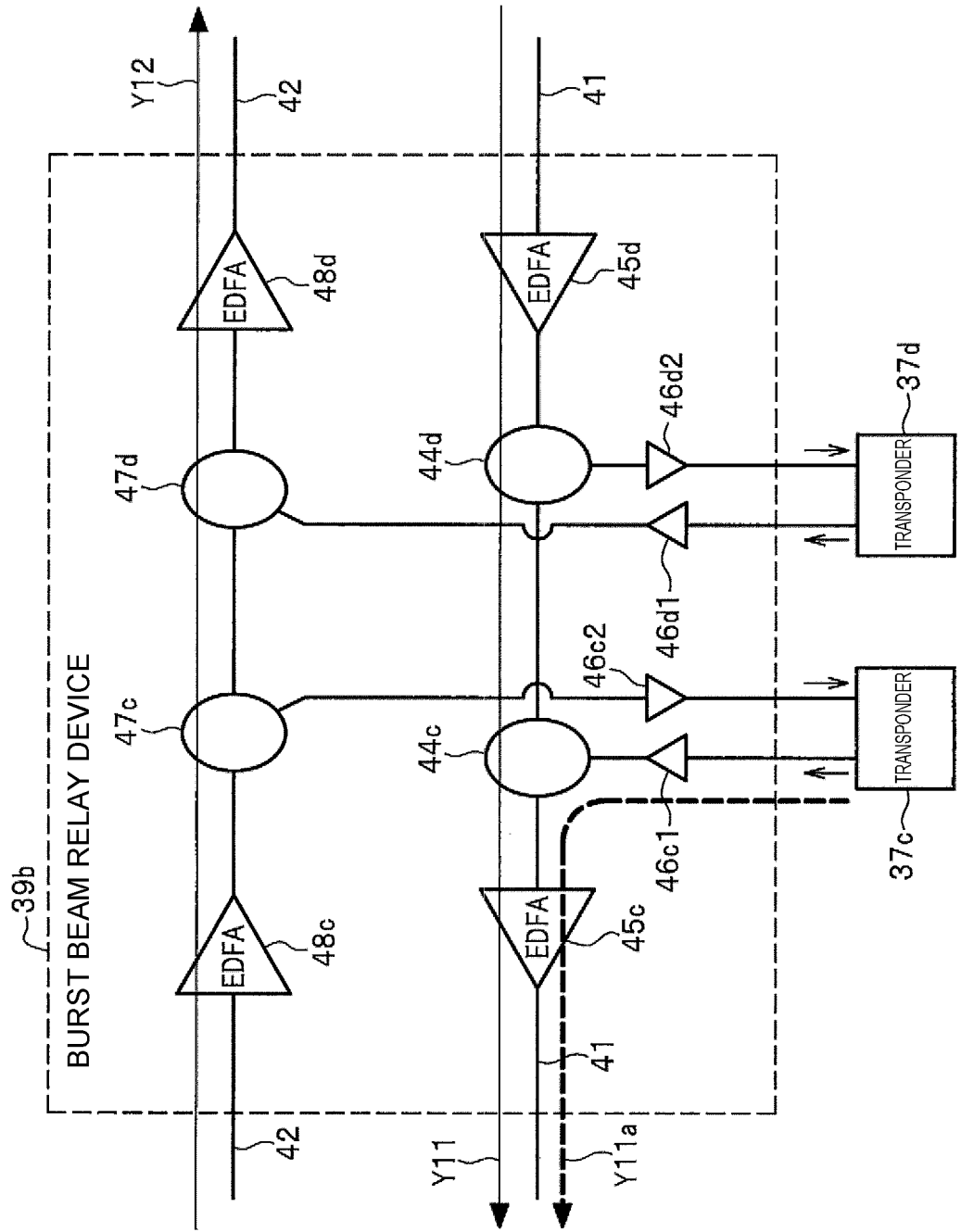
FIG. 13 is a block diagram illustrating the configuration of a conventional burst beam relay device.
Figure 14:
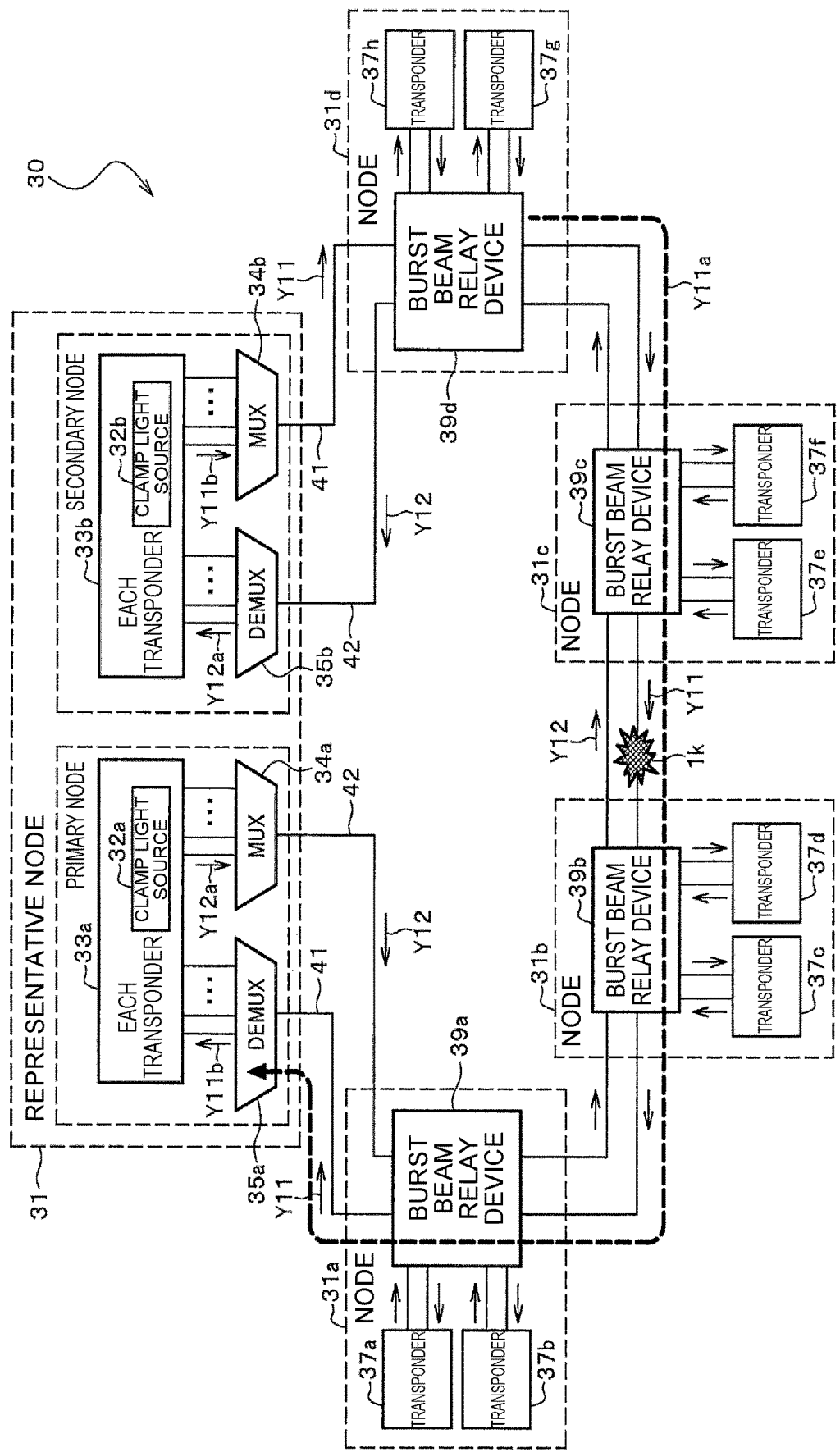
FIG. 14 is a block diagram illustrating a failure of an outer optical transmission line in the conventional burst beam relay system.
Figure 15:
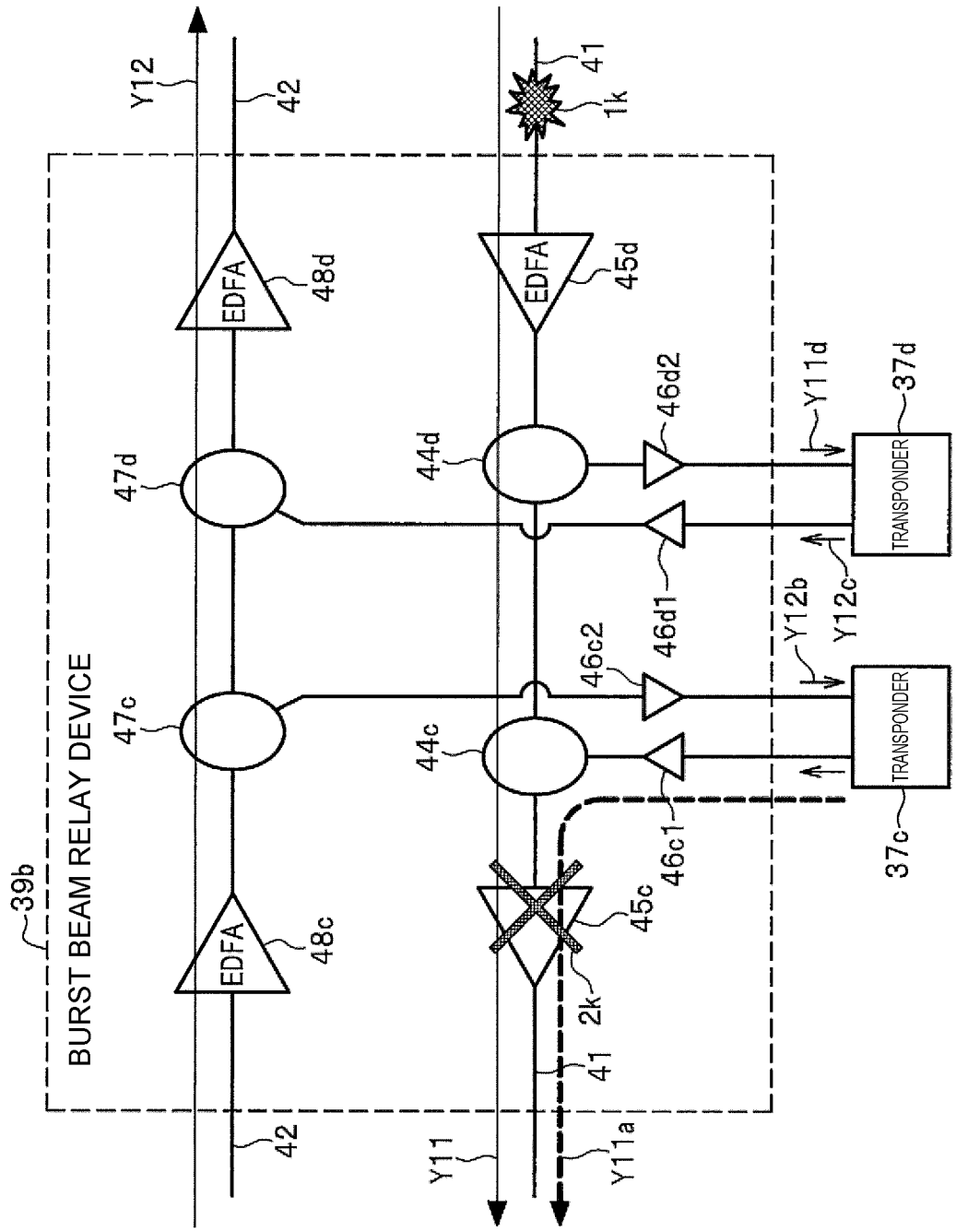
FIG. 15 is a block diagram illustrating a state in which overshoot cannot be suppressed with an EDFA of the conventional burst beam relay device.

A burst beam amplification system (i.e., a system) 30A illustrated in FIG. 1 differs from the conventional system 30 (FIG. 12) in burst beam relay devices (i.e., relay devices) 39aA, 39bA, 39CA, and 39dA provided in respective nodes 31a to 31d that are connected to a representative node 31 through double rings. The double rings include an outer optical transmission line 41 and an inner optical transmission line 42 made of double optical fibers that transmit optical signals in mutually opposite directions as indicated by the arrows Y11 and Y12.

The representative node 31 has an active/auxiliary configuration including a primary node and a secondary node. The primary node includes transponders 33a each having a clamp light source 32a, a MUX (multiplexer) 34a, and a DEMUX (demultiplexer) 35a. The secondary node includes transponders 33b each having a clamp light source 32b, a MUX 34b, and a DEMUX 35b.

The nodes 31a to 31d respectively include pairs of active and auxiliary transponders 37a to 37h in addition to the relay devices 39aA to 39dA. It should be noted that a transmission device (not illustrated) is connected to each of the transponders 37a to 37h and each of the transponders 33a and 33b of the representative node 31.

The configurations of the burst beam relay devices 39aA to 39dA will be described using the relay device 39bA illustrated in FIG. 2 as a representative example. The relay device 39bA includes optical signal return units 50a and 50b and detection units 55a and 55b as the characteristic elements of the present invention. Besides, the relay device 39bA includes an EDFA 45d, optical couplers 44d and 44c, and an EDFA 45c connected in this order to the outer optical transmission line 41 in the direction of the arrow Y11. The relay device 39bA also includes an EDFA 48c, optical couplers 47c and 47d, and an EDFA 48d connected in this order to the inner optical transmission line 42 in the direction of the arrow Y12. Further, the relay device 39bA includes buffers 46c1, 46c2, 46d1, and 46d2 connected between the transponders 37c and 37d and the optical couplers 44c, 44d, 47c, and 47d.

The optical signal return units 50a and 50b are provided across the outer optical transmission line 41 and the inner optical transmission line 42, and each include isolators 51a and 51b, optical couplers 52a and 52b, a filter 53, and a gate unit 54.

First, referring to the optical signal return unit 50a, the isolator 51a and the optical coupler 52a, which are connected to the inner optical transmission line 42, are connected in this order between the EDFA 48c and the optical coupler 47c on the side of the inner optical transmission line 42 in the direction toward the secondary node (FIG. 1) indicated by the arrow Y12 (referred to as a secondary node direction Y12). It should be noted that the isolator 51a forms a first isolator recited in the claims, and the optical coupler 52a forms a first optical coupler recited in the claims.

The isolator 51b and the optical coupler 52b, which are connected to the outer optical transmission line 41, are connected in this order between the optical coupler 44c and the EDFA 45c on the side of the outer optical transmission line 41 in the direction toward the primary node (FIG. 1) indicated by the arrow Y11 (referred to as a primary node direction Y11).

The filter 53 and the gate unit 54 are connected in this order between the optical coupler 52a connected to the inner optical transmission line 42 and the optical coupler 52b connected to the outer optical transmission line 41 in the direction from the inner optical transmission line 42 toward the outer optical transmission line 41.

The detection unit 55a is connected to the input side of the EDFA 48c having connected thereto the isolator 51a on the side of the inner optical transmission line 42. That is, the detection unit 55a is connected to an input terminal for an optical signal transmitted through the inner optical transmission line 42 in the secondary node direction Y12 in the relay device 39bA.

Next, referring to the optical signal return unit 50b, the isolator 51b and the optical coupler 52b connected to the outer optical transmission line 41 are connected in this order between the EDFA 45d and the optical coupler 44d on the side of the outer optical transmission line 41 in the primary node direction Y11. It should be noted that the isolator 51b forms a second isolator recited in the claims, and the optical coupler 52b forms a second optical coupler recited in the claims.

The isolator 51a and the optical coupler 52a connected to the inner optical transmission line 42 are connected in this order between the optical coupler 47d and the EDFA 48d on the side of the inner optical transmission line 42 in the secondary node direction Y12.

The filter 53 and the gate unit 54 are connected in this order between the optical coupler 52b connected to the outer optical transmission line 41 and the optical coupler 52a connected to the inner optical transmission line 42 in the direction from the outer optical transmission line 41 toward the inner optical transmission line 42.

The detection unit 55b is connected to the input side of the EDFA 45d having connected thereto the isolator 51b on the side of the outer optical transmission line 41. That is, the detection unit 55b is connected to an input terminal for an optical signal transmitted through the outer optical transmission line 41 in the primary node direction Y11 in the relay device 39bA.

The process operation of the components of such optical signal return units 50a and 50b, which have the same configuration, will be described with reference to a flowchart of FIG. 3. It should be noted that the description will be made using the optical signal return unit 50a as a representative example.

Figure 3:
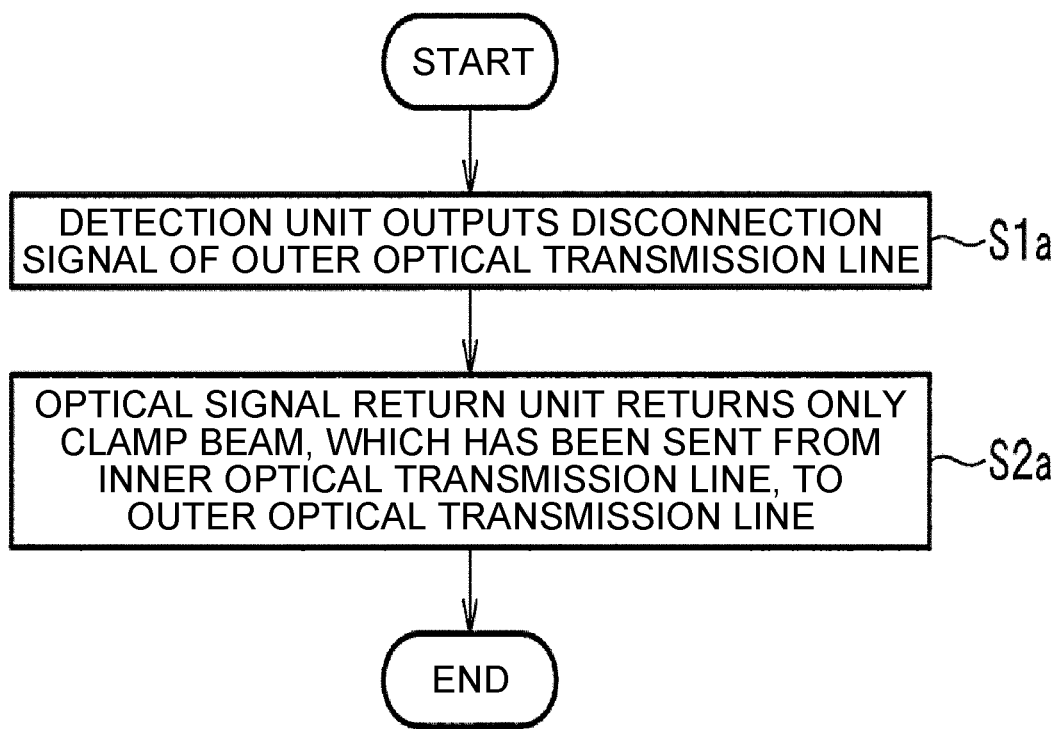
FIG. 3 is a first flowchart for illustrating the operation of the burst beam relay device according to an embodiment of the present invention.

In step S1a of FIG. 3, when the detection unit 55 of the relay device 39bA has not detected an optical signal input via, of the outer optical transmission line 41 and the inner optical transmission line 42, the outer optical transmission line 41 for a predetermined time or longer, the detection unit 55 outputs a disconnection signal of the outer optical transmission line 41.

Next, in step S2a, only when there is an input of the disconnection signal, the optical signal return unit 50a returns to the outer optical transmission line 41 only a clamp beam that has been sent from the representative node 31 via the inner optical transmission line 42 in the direction opposite to the optical signal input via the outer optical transmission line 41.

Figure 4:
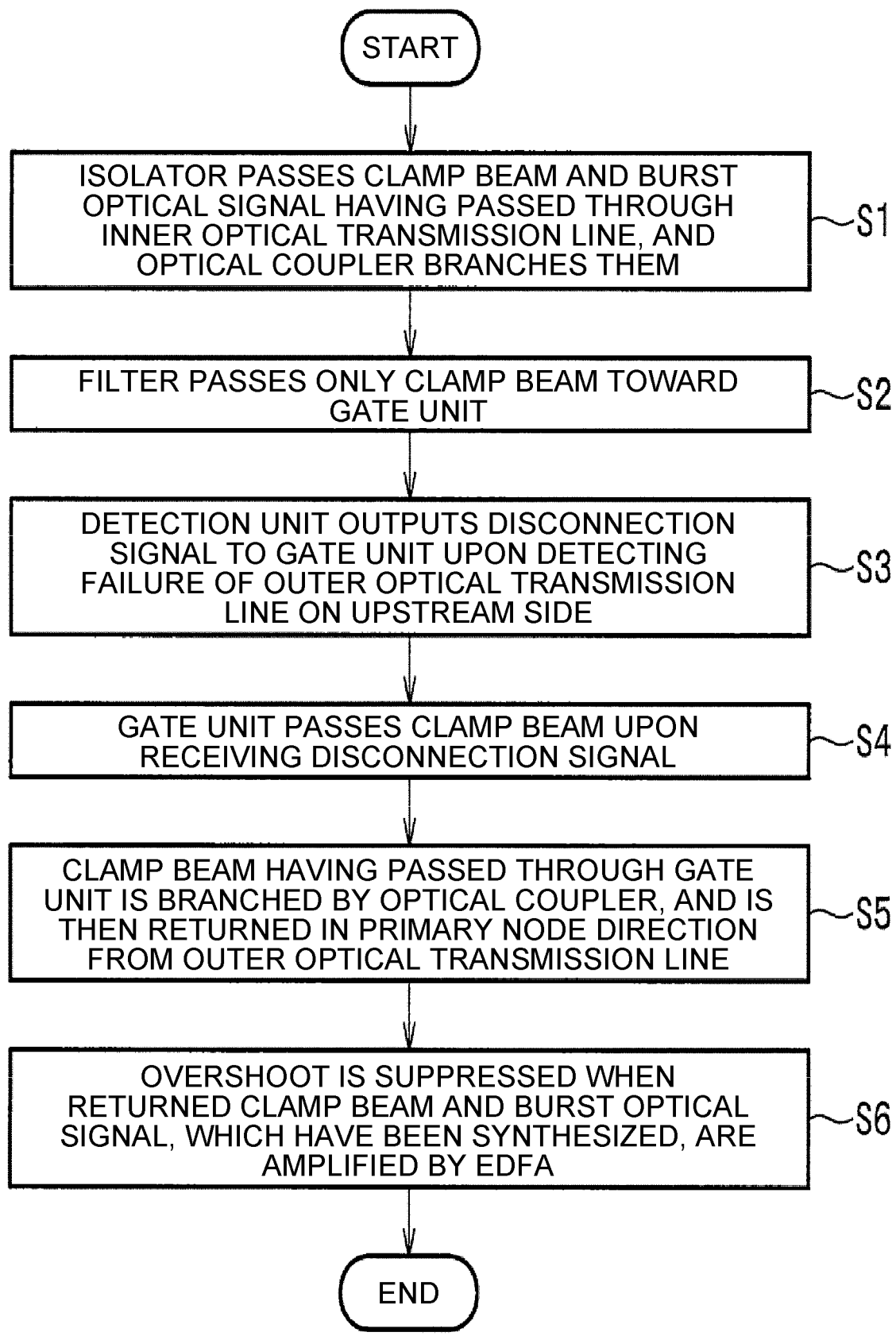
FIG. 4 is a second flowchart for illustrating the operation of the burst beam relay device according to an embodiment of the present invention.

Next, the detailed operation will be described with reference to a flowchart of FIG. 4.

In step S1, the isolator 51a passes optical signals based on a clamp beam with a wavelength 14 and a burst optical signal with a wavelength λ1, which have been sent from the primary node via the inner optical transmission line 42, only in the secondary node direction Y12. The optical coupler 52a branches the optical signals having passed through the isolator 51a so that the resulting signals are transmitted in the secondary node direction Y12 and to the filter 53.

In step S2, the filter 53 is adapted to pass only an optical signal with a wavelength 14, and thus passes only the clamp beam with the wavelength 24 of the optical signals from the optical coupler 52a, toward the gate unit 54.

In step S3, if the detection unit 55b has detected an optical signal input to the relay device 39b via the outer optical transmission line 41 in the primary node direction Y11 within a predetermined time, the detection unit 55b sends no signal to the gate unit 54. Meanwhile, if the detection unit 55 has detected no optical signal within a predetermined time, the detection unit 55 outputs to a control terminal of the gate unit 54 a disconnection signal indicating the disconnected state of the outer optical transmission line 41.

For example, when a failure 1k has occurred in the outer optical transmission line 41 on the upstream side of the relay device 39bA in the primary node direction Y11, an optical signal is no longer transmitted to the relay device 39b. Thus, the detection unit 55b detects no optical signal, and if such a state has continued for a predetermined time or longer, the detection unit 55b outputs a disconnection signal to the gate unit 54.

In step S4, the gate unit 54 is usually OFF and thus blocks the passage of a clamp beam, but is turned ON when its control terminal has received a disconnection signal from the detection unit 55b, and thus passes a clamp beam.

In step S5, the clamp beam having passed through the gate unit 54 is input to the optical coupler 52b. The upstream side of the optical coupler 52b in the primary node direction Y11 has the isolator 51b connected thereto such that the isolator 51b passes an optical signal only in the primary node direction Y11. Therefore, the clamp beam input to the optical coupler 52b is not transmitted to the side of isolator 51b but is input to the EDFA 45c.

Through such a process, upon occurrence of the failure 1k in the outer optical transmission line 41, a clamp beam that has been sent via the inner optical transmission line 42 in the secondary node direction Y12 is returned in the primary node direction Y11 via the outer optical transmission line 41 from the isolator 51a, the optical coupler 52a, the filter 53, the gate unit 54, and the optical coupler 52b as indicated by the dashed arrow Y12e.

In this manner, returning a clamp beam allows a burst optical signal sent from the transponder 37c to be synthesized with the clamp beam by the optical coupler 44c via the buffer 46cl and then be output to the EDFA 45c. In step S6, since the synthesized burst optical signal and clamp beam are amplified as a continuous signal by the EDFA 45c, the aforementioned overshoot is suppressed. After the overshoot is suppressed in this manner, the clamp beam is removed with a filter (not illustrated), and only the burst optical signal may be transmitted in the primary node direction Y11.

The transponder 37c can receive a burst optical signal, which has been transmitted via the inner optical transmission line 42, via the optical coupler 47c and the buffer 46c2. Thus, sending and receiving of the burst optical signal are possible.

Such return of a clamp beam is also illustrated in FIG. 1 as indicated by the dashed arrow Y12e. That is, a clamp beam sent from the clamp light source 32a of the primary node is transmitted from the MUX 34a to the inner optical transmission line 42, and is then returned by the relay device 39bA of the node 31b via the node 31a. The returned clamp beam is received by the DEMUX 35a of the primary node via the node 31a. Then, the received clamp beam is removed with a filter, for example.

Figure 2:
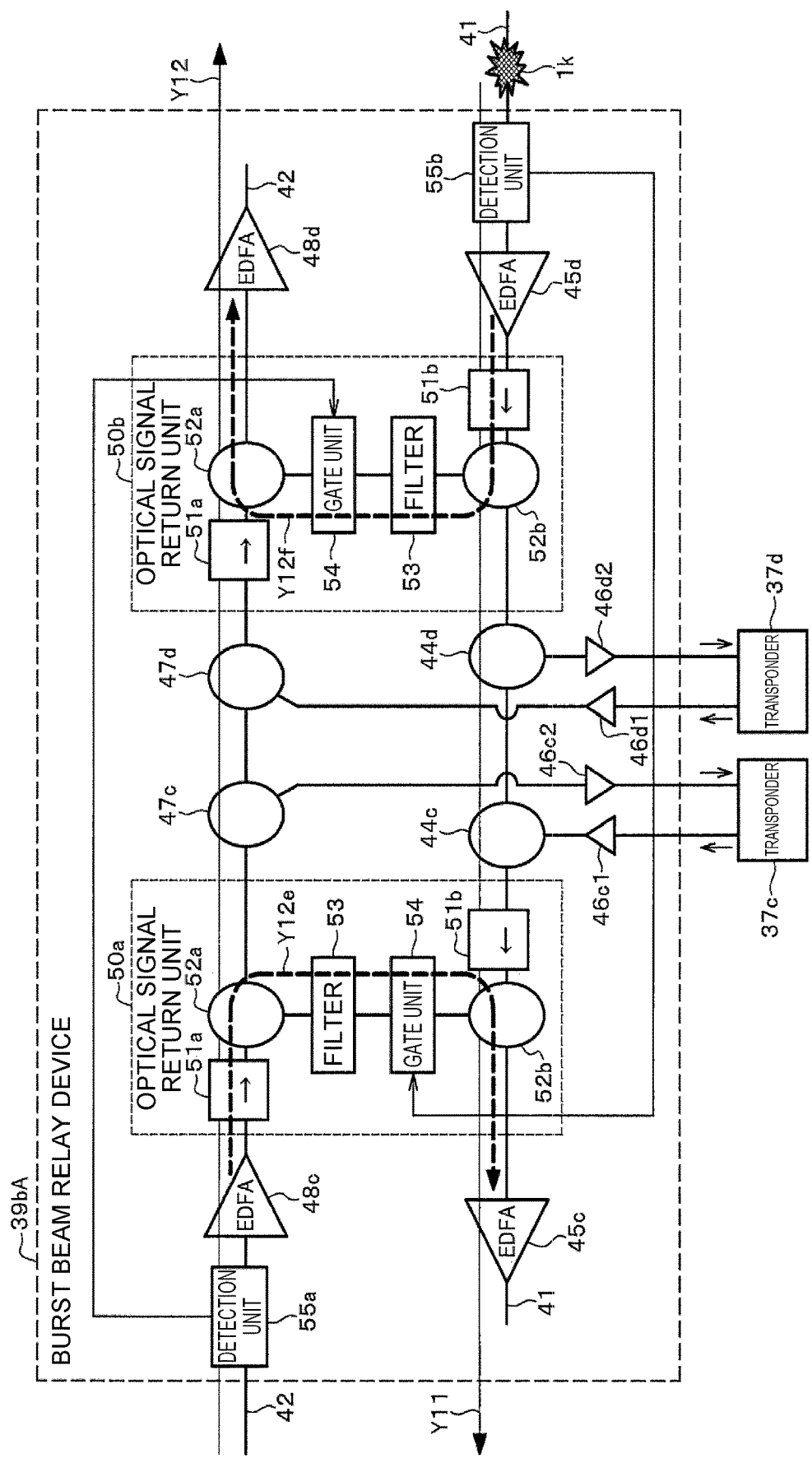
FIG. 2 is a block diagram illustrating the configuration of a burst beam relay device according to an embodiment of the present invention.

Likewise, in the optical signal return unit 50b illustrated in FIG. 2, upon occurrence of a failure in the inner optical transmission line 42 on the upstream side of the relay device 39bA, a clamp beam sent via the outer optical transmission line 41 in the primary node direction Y11 is returned in the secondary node direction Y12 via the inner optical transmission line 42 from the isolator 51b, the optical coupler 52b, the filter 53, the gate unit 54, and the optical coupler 52a as indicated by the dashed arrow Y12f.

Figure 5:
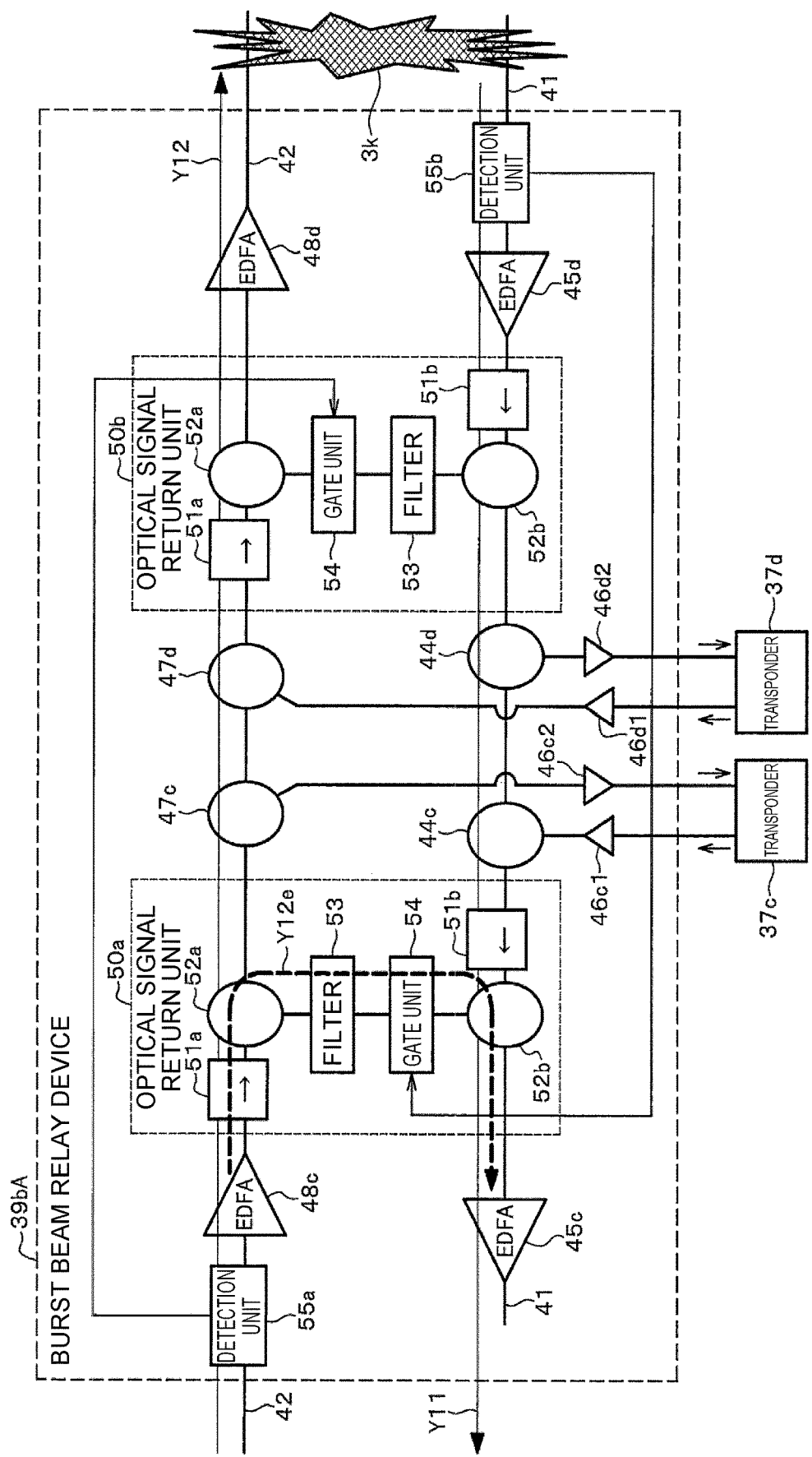
FIG. 5 is a block diagram illustrating a state in which both double rings have failed in the burst beam relay device according to an embodiment of the present invention.

As illustrated in FIG. 5, even when a failure 3k has occurred both in the outer optical transmission line 41 on the upstream side of the relay device 39bA in the primary node direction Y11 and in the inner optical transmission line 42, the aforementioned optical signal return unit 50a can return a clamp beam sent from the primary node to the primary node as indicated by the arrow Y12e. Such return of a clamp beam allows for the transmission of a burst optical signal from the transponder 37c in the primary node direction Y11 while suppressing overshoot.

Effects of Embodiment

Next, the effects of the burst beam relay devices 39aA to 39dA according to the present embodiment will be described using the relay device 39bA illustrated in FIG. 2 as a representative example.

(1a) The relay device 39bA includes the optical signal return unit 50a and the detection unit 55b.

The optical signal return unit 50a is connected to the representative node 31 with an active/auxiliary configuration, which sends and receives a burst optical signal and sends a continuous-wave clamp beam with a wavelength different from that of the burst optical signal, via the two optical transmission lines 41 and 42 with a double-ring configuration, which perform optical transmission in mutually opposite directions, in a manner relaying the burst optical signal and an optical signal of the clamp beam. The optical signal return unit 50a is connected across the two optical transmission lines 41 and 42 in each of the plurality of nodes 31a to 31d that sends and receives the burst optical signal.

The detection unit 55 outputs, when an optical signal input via, of the two optical transmission lines 41 and 42, the optical transmission line 41 has not been detected for a predetermined time or longer, a disconnection signal of the optical transmission line.

The optical signal return unit 50a is configured to, only when there is an input of the disconnection signal, return to one of the optical transmission lines 41 only a clamp beam that has been sent from the representative node 31 via the other optical transmission line 42 in the direction opposite to the optical signal input via the one of the optical transmission lines 41.

According to such a configuration, the detection unit 55b outputs a disconnection signal to the optical signal return unit 50a upon occurrence of a failure in one of the optical transmission lines 41 with a double-ring configuration. The optical signal return unit 50a that has received the disconnection signal returns to the one of the optical transmission lines 41 only a clamp beam that has been sent from the other optical transmission line 42 in the direction opposite to the optical signal. The returned clamp beam is synthesized with a burst optical signal sent from the node 31b, and the synthesized signals are input to the EDFA 45c connected to some midpoint of the one of the optical transmission lines 41. Since the EDFA 45c amplifies the synthesized burst optical signal and clamp beam as a continuous signal, it is possible to suppress overshoot that would occur if the burst optical signal is amplified alone. Therefore, the EDFA 45c can, upon occurrence of a failure in the one of the optical transmission lines 41 with a double-ring configuration, send a burst optical signal to the other optical transmission line 42 while suppressing overshoot.

(2a) The optical signal return unit 50a includes the isolator 51a for passing an optical signal, which is transmitted through the other optical transmission line 42 in the node 31b in the direction opposite to the one of the optical transmission lines 41, only in the transmission direction of the optical signal, and the optical coupler 52a for branching the optical signal having passed through the isolator 51a. The optical signal return unit 50a also includes the isolator 51b for passing an optical signal, which is transmitted through the one of the optical transmission lines 41 and 42 in each of the nodes 31a to 31d, only in the transmission direction of the optical signal, the optical coupler 52b connected to the output side of the optical signal of the isolator 51b, and the filter 53 and the gate unit 54 connected in a cascade arrangement between the optical coupler 52a and the optical coupler 52b.

The filter 53 passes only the clamp beam branched by the optical coupler 52a, and the gate unit 54 passes the clamp beam having passed through the filter 53 only when there is an input of the aforementioned disconnection signal, and further, the optical coupler 52b synthesizes the clamp beam having passed through the gate unit 54 with a burst optical signal that has passed through the isolator 51b and that is to be sent to the representative node 31, and then sends the synthesized signals to the one of the optical transmission lines 41.

According to such a configuration, the optical coupler 52b has connected thereto, on the side opposite to the optical signal transmission direction of the one of the optical transmission lines 41, the isolator 51b that passes an optical signal only in the optical signal transmission direction. Therefore, a clamp beam synthesized with a burst optical signal by the optical coupler 52b is not transmitted in the direction of the isolator 51b, and is reliably transmitted in the original optical signal transmission direction. Accordingly, the burst optical signal and the clamp beam synthesized by the optical coupler 52b are amplified as a continuous signal by the EDFA 45c connected to some midpoint of the one of the optical transmission lines 41. Therefore, the EDFA 45c can suppress overshoot that would occur if the burst optical signal is amplified alone.

Modified Example 1 of Embodiment

Figure 6:
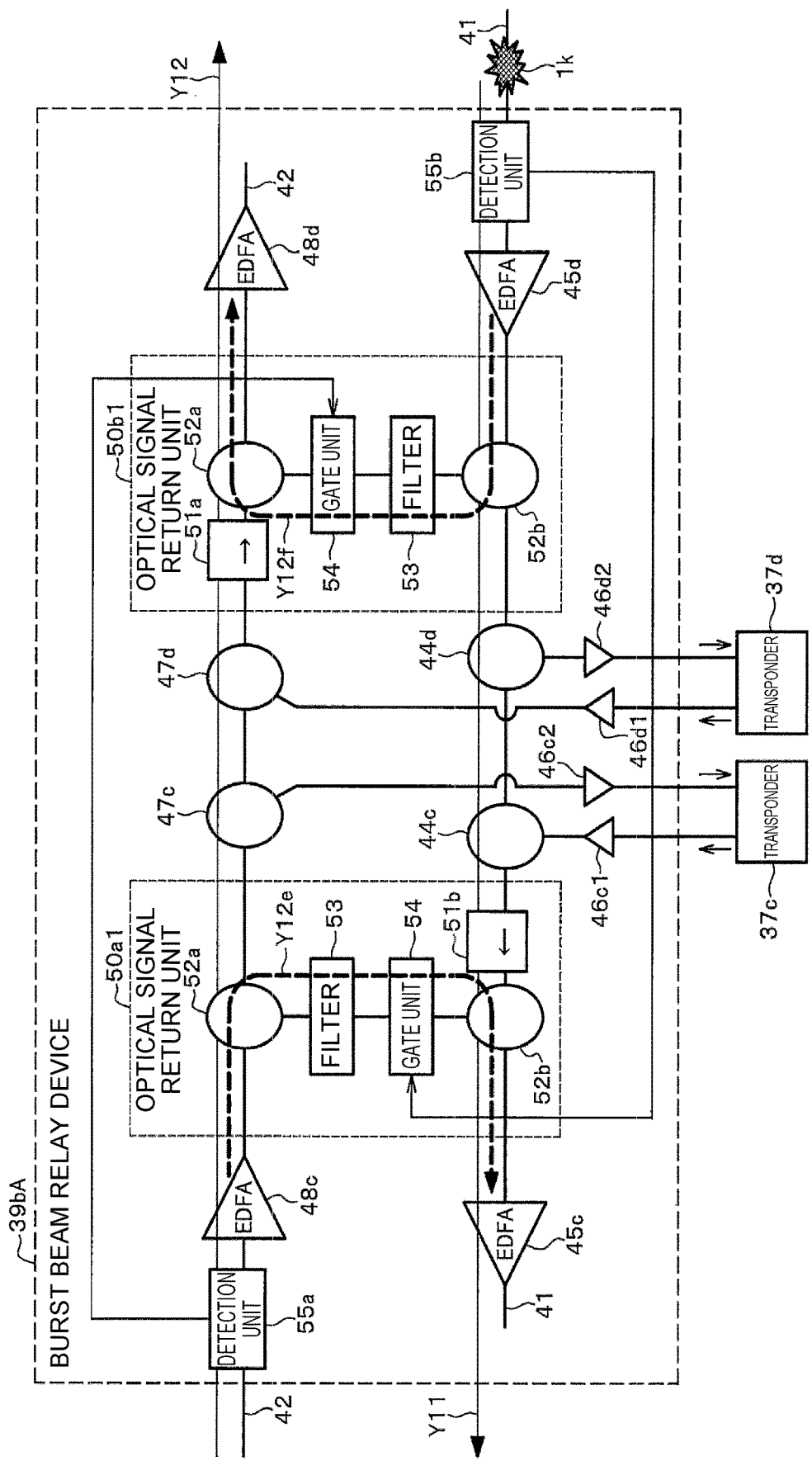
FIG. 6 is a block diagram illustrating the configuration of a burst beam relay device according to Modified Example 1 of the embodiment of the present invention.

FIG. 6 is a block diagram illustrating the configuration of a burst beam relay device according to Modified Example 1 of the embodiment of the present invention.

The burst beam relay device 39bA of Modified Example 1 illustrated in FIG. 6 differs from the relay device 39bA (FIG. 2) of the aforementioned embodiment in that the isolators 51a and 51b (FIG. 2) on the optical signal input sides of the optical signal return units 50a and 50b (FIG. 2) are removed.

That is, an optical signal return unit 50a1 illustrated in FIG. 6 includes the optical couplers 52a and 52b, the filter 53, and the gate unit 54. An optical signal return unit 50b1 includes the optical couplers 52a and 52b, the filter 53, and the gate unit 54.

Without the isolator 51a (FIG. 2) on the input side of the optical signal return unit 50a1, a passage loss of a clamp beam through the isolator is reduced. With a reduced loss, the transmission efficiency of the clamp beam can be improved. In addition, since the optical signal return unit 50a1 has no isolator on the inner optical transmission line 42 and has the isolator 51b on the outer optical transmission line 41, a loss of the inner ring and a loss of the outer ring in the double-ring configuration become asymmetrical, which facilitates the design of the optical transmission lines. Further, since the optical signal return unit 50a1 has only one isolator 51b, the amount of resources can be reduced than in the relay device 39bA (FIG. 2) of the embodiment.

Modified Example 2 of Embodiment

Figure 7:
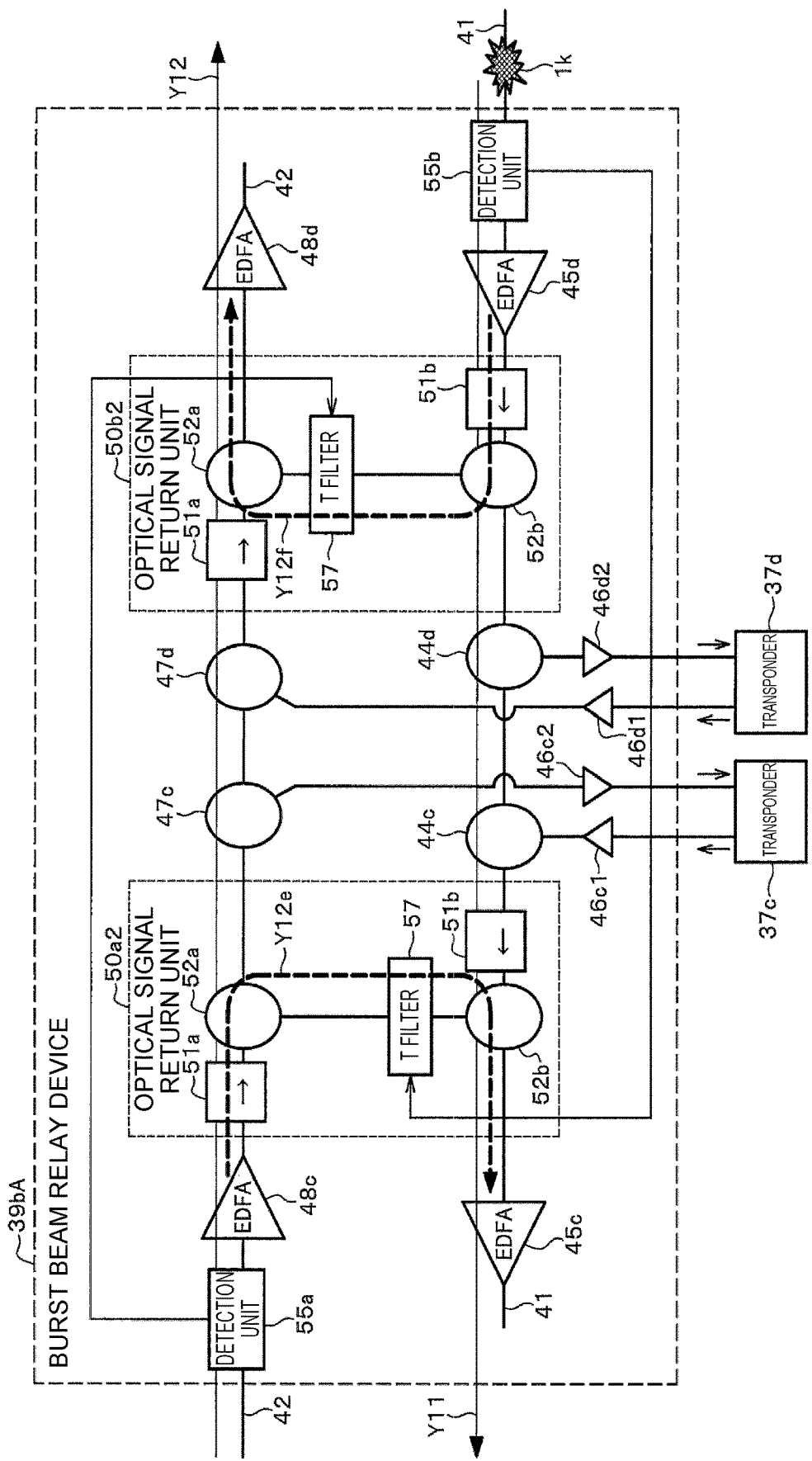
FIG. 7 is a block diagram illustrating the configuration of a burst beam relay device according to Modified Example 2 of the embodiment of the present invention.

FIG. 7 is a block diagram illustrating the configuration of a burst beam relay device according to Modified Example 2 of the embodiment of the present invention.

The burst beam relay device 39bA of Modified Example 2 illustrated in FIG. 7 differs from the relay device 39bA (FIG. 2) of the aforementioned embodiment in that in each of optical signal return units 50a2 and 50b2, a T filter (i.e., a tunable wavelength filter) 57 is connected between the optical coupler 52a connected to the inner optical transmission line 42 and the optical coupler 52b connected to the outer optical transmission line 41, instead of the filter 53 and the gate unit 54.

The T filter 57 is a filter with a variable pass band for optical signals, and usually has a band that passes neither a burst optical signal nor a clamp beam, but, when there is an input of a disconnection signal from the detection unit 55a or the detection unit 55b, has a band that passes only a clamp beam.

Each of such optical signal return units 50a2 and 50b2 includes one component that is the T filter 57 instead of the two components that are the filter 53 and the gate unit 54. Thus, the amount of resources can be reduced than in the relay device 39bA (FIG. 2) of the embodiment.

Modified Example 3 of Embodiment

Figure 8:
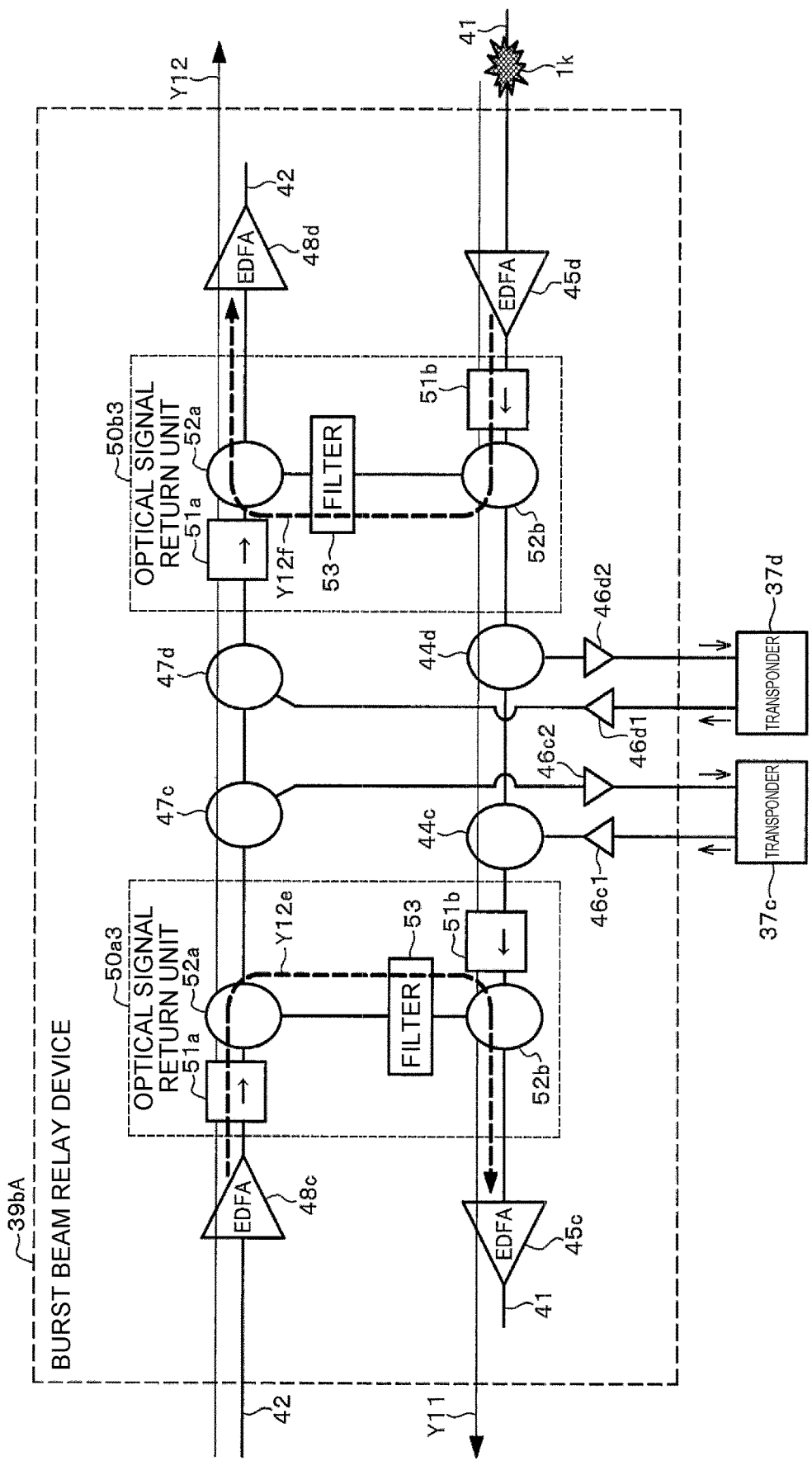
FIG. 8 is a block diagram illustrating the configuration of a burst beam relay device according to Modified Example 3 of the embodiment of the present invention.
Figure 9:
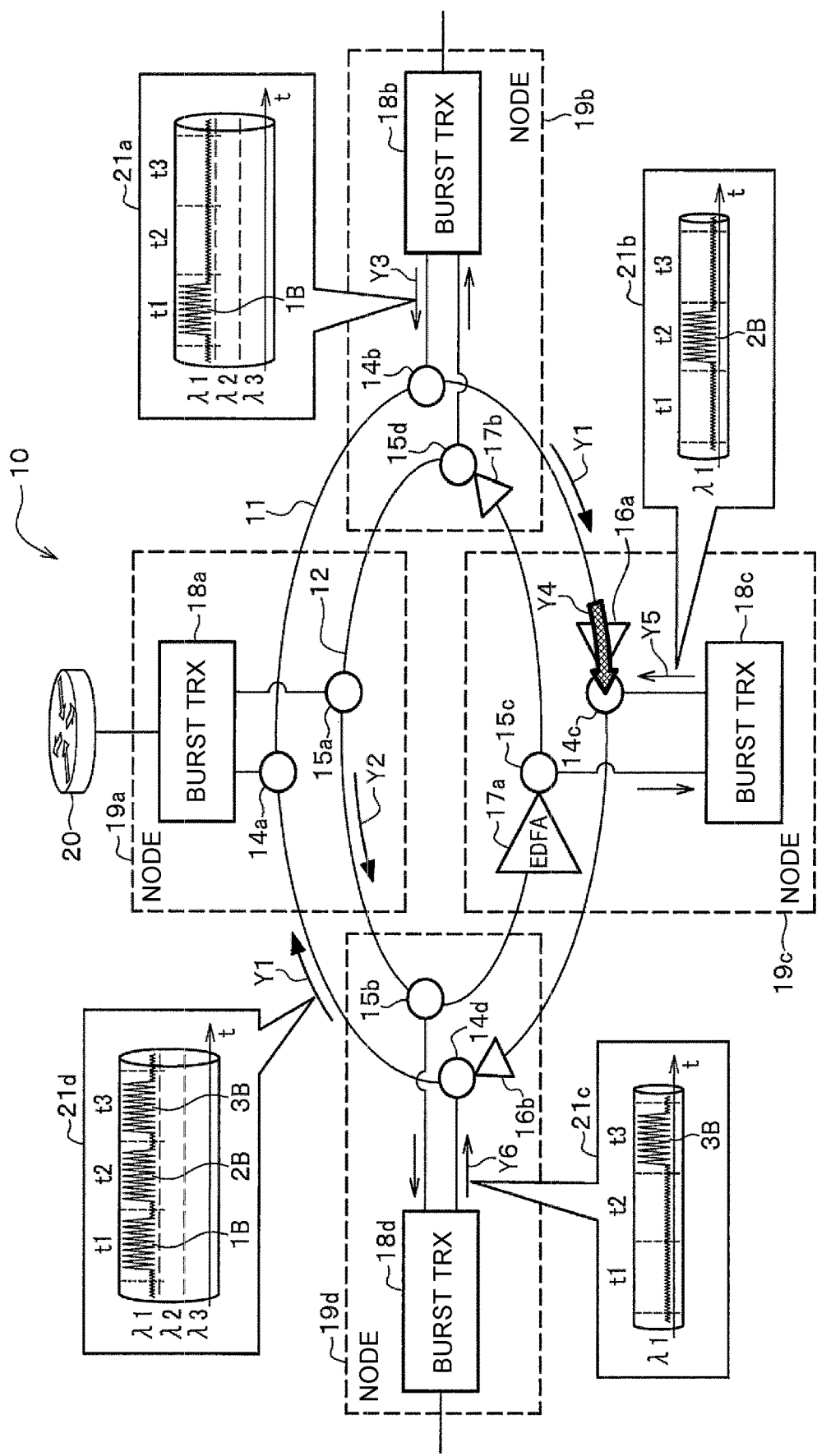
FIG. 9 is a block diagram illustrating the configuration of an optical TDM network.
Figure 10:
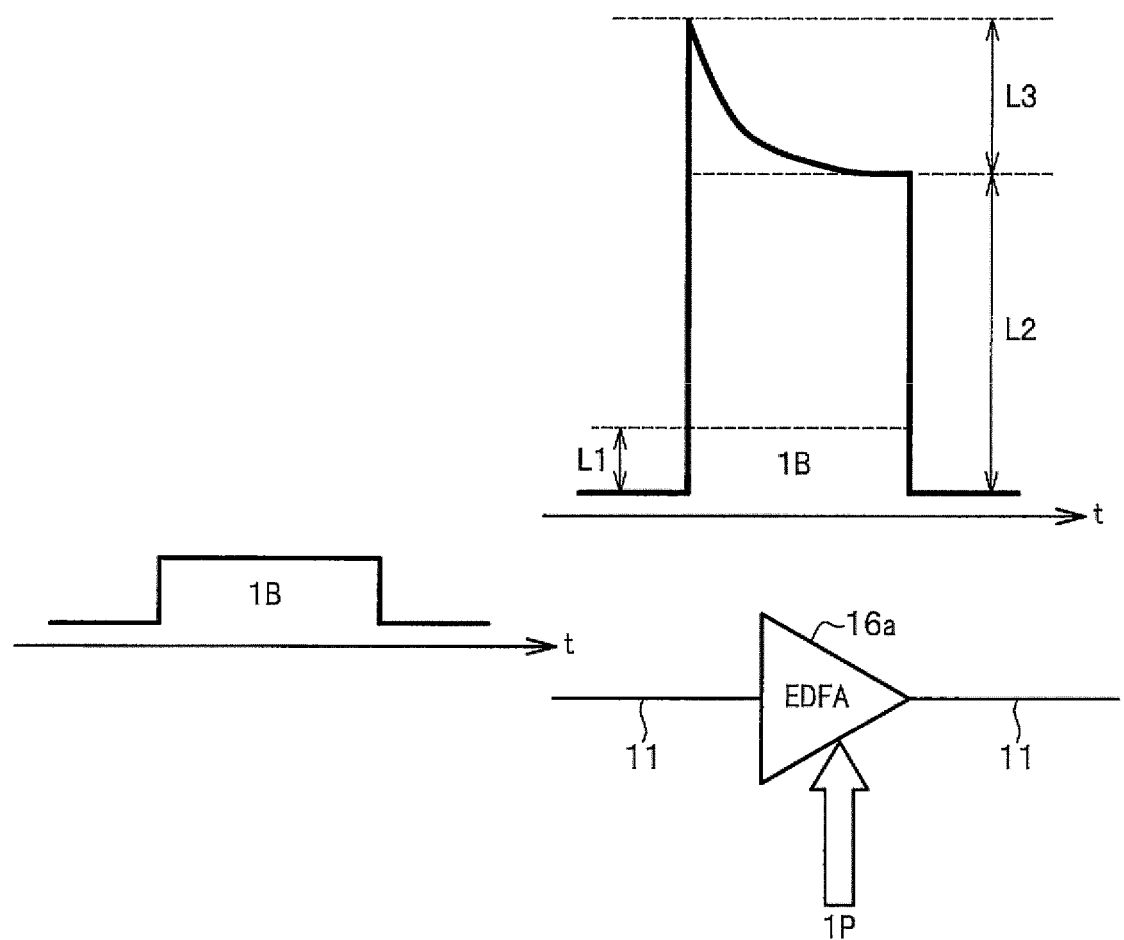
FIG. 10 is a view illustrating overshoot that occurs when a burst optical signal is amplified by an EDFA.
Figure 11:
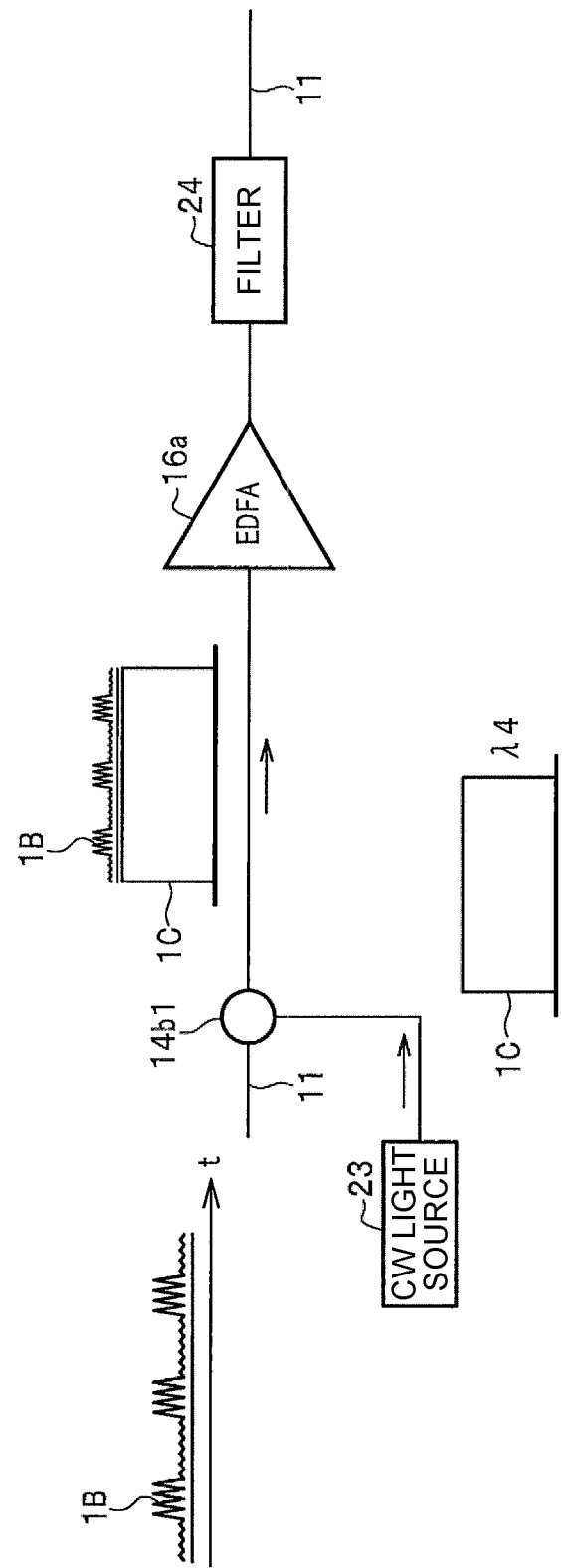
FIG. 11 is a view illustrating the suppression of overshoot that occurs in an EDFA.

FIG. 8 is a block diagram illustrating the configuration of a burst beam relay device according to Modified Example 3 of the embodiment of the present invention.

The burst beam relay device 39bA of Modified Example 3 illustrated in FIG. 8 differs from the relay device 39bA (FIG. 2) of the aforementioned embodiment in that each of optical signal return units 50a3 and 50b3 does not include the gate unit 54 illustrated in FIG. 2, and includes the isolators 51a and 51b, the optical couplers 52a and 52b, and the filter 53 as illustrated in FIG. 8. It should be noted that the burst beam relay device 39bA of Modified Example 3 does not include the detection units 55a and 55b.

According to such a configuration, referring to the optical signal return unit 50a3 as a representative example, only a clamp beam that has passed through the isolator 51a on the inner optical transmission line 42 and has been branched by the optical coupler 52a always passes through the filter 53 and is synthesized with a burst optical signal by the optical coupler 52b, and is then returned to the inner optical transmission line 42. Such a sending operation is performed even when the failure 1k has occurred in the outer optical transmission line 41 on the input side of the relay device 39bA in the primary node direction Y11.

Since each of the optical signal return units 50a3 and 50b3 can be configured with two isolators 51a and 51b, two optical couplers 52a and 52b, and one filter 53, the amount of resources can be significantly reduced than in the relay device 39bA (FIG. 2) of the embodiment.

<Effects>

(1) There is provided a burst beam relay device including an optical signal return unit connected to a representative node with an active/auxiliary configuration that sends and receives a burst optical signal and sends a continuous-wave clamp beam with a wavelength different from a wavelength of the burst optical signal, via two optical transmission lines with a double-ring configuration that perform optical transmission in mutually opposite directions, in a manner relaying the burst optical signal and an optical signal of the clamp beam, the optical signal return unit being connected across the two optical transmission lines in each of a plurality of nodes that sends and receives the burst optical signal; and a detection unit that, when an optical signal input via one of the two optical transmission lines has not been detected for a predetermined time or longer, outputs a disconnection signal of the optical transmission line to the optical signal return unit, in which only when there is an input of the disconnection signal, the optical signal return unit returns to the one of the optical transmission lines only a clamp beam that has been sent from the representative node via another optical transmission line in a direction opposite to the optical signal input via the one of the optical transmission lines.

According to such a configuration, the detection unit outputs a disconnection signal to the optical signal return unit upon occurrence of a failure in one of the optical transmission lines with a double-ring configuration. The optical signal return unit that has received the disconnection signal returns to the one of the optical transmission lines only a clamp beam that has been sent from the other optical transmission line in the direction opposite to the optical signal. The returned clamp beam is synthesized with a burst optical signal sent from the node, and the synthesized signals are input to an EDFA connected to some midpoint of the one of the optical transmission lines. Since the EDFA amplifies the synthesized burst optical signal and clamp beam as a continuous signal, it is possible to suppress overshoot that would occur if the burst optical signal is amplified alone. Therefore, when a failure has occurred in one of the optical transmission lines with a double-ring configuration, it is possible to send a burst optical signal to the other optical transmission line while suppressing overshoot.

(2) There is provided the burst beam relay device according to (1) described above, in which the optical signal return unit includes a first isolator that passes an optical signal transmitted through the other optical transmission line in the node in a direction opposite to the one of the optical transmission lines, only in a transmission direction of the optical signal, a first optical coupler that branches the optical signal having passed through the first isolator, a second isolator that passes an optical signal transmitted through the one of the optical transmission lines in the node, only in a transmission direction of the optical signal, a second optical coupler connected to an output side of the optical signal of the second isolator, and a filter and a gate unit connected in a cascade arrangement between the first optical coupler and the second optical coupler, the filter passes only the clamp beam branched by the first optical coupler, the gate unit passes the clamp beam having passed through the filter only when there is an input of the disconnection signal, and the second optical coupler synthesizes the clamp beam having passed through the gate unit with a burst optical signal that has passed through the second isolator and that is to be sent to the representative node, and returns the synthesized signals to the one of the optical transmission lines.

According to such a configuration, the second optical coupler has connected thereto, on the side opposite to the optical signal transmission direction of the one of the optical transmission lines, the second isolator that passes an optical signal only in the optical signal transmission direction. Therefore, a clamp beam synthesized with a burst optical signal by the second optical coupler is not transmitted in the direction of the second isolator, and is reliably transmitted in the original optical signal transmission direction. Accordingly, the burst optical signal and the clamp beam synthesized by the second optical coupler are amplified as a continuous signal by the EDFA connected to some midpoint of the one of the optical transmission lines. Therefore, the EDFA can suppress overshoot that would occur if the burst optical signal is amplified alone.

(3) There is provided the burst beam relay device according to (1) described above, in which the optical signal return unit includes a first optical coupler that branches an optical signal transmitted through the other optical transmission line in the node in a direction opposite to the one of the optical transmission lines, an isolator that passes an optical signal transmitted through the one of the optical transmission lines in the node, only in a transmission direction of the optical signal, a second optical coupler connected to an output side of the optical signal of the isolator, and a filter and a gate unit connected in a cascade arrangement between the first optical coupler and the second optical coupler, the filter transmits only the clamp beam branched by the first optical coupler, the gate unit passes the clamp beam having passed through the filter only when there is an input of the disconnection signal, and the second optical coupler synthesizes the clamp beam having passed through the gate unit with a burst optical signal that has passed through the isolator and that is to be sent to the representative node, and returns the synthesized signals to the one of the optical transmission lines.

According to such a configuration, since there is no isolator on the input side on the other optical transmission line, a passage loss of a clamp beam is reduced. With a reduced loss, the transmission efficiency of the clamp beam can be improved. In addition, since the optical signal return unit has an isolator on one of the optical transmission lines and has no isolator on the other optical transmission line, a loss of the one of the optical transmission lines (i.e., the outer ring) and a loss of the other optical transmission line (i.e., the inner ring) in the double-ring configuration become asymmetrical, which facilitates the design of the optical transmission lines.

(4) There is provided the burst beam relay device according to (1) described above, in which the optical signal return unit includes a first isolator that passes an optical signal transmitted through the other optical transmission line in the node in a direction opposite to the one of the optical transmission lines, only in a transmission direction of the optical signal, a first optical coupler that branches the optical signal having passed through the first isolator, a second isolator that passes an optical signal transmitted through the one of the optical transmission lines in the node, only in a transmission direction of the optical signal, a second optical coupler connected to an output side of the optical signal of the second isolator, and a tunable wavelength filter connected between the first optical coupler and the second optical coupler and having a variable pass band for an optical signal, the tunable wavelength filter passes only the clamp beam when there is an input of the disconnection signal, and the second optical coupler synthesizes the clamp beam having passed through the tunable wavelength filter with a burst optical signal that has passed through the second isolator and that is to be sent to the representative node, and returns the synthesized signals to the one of the optical transmission lines.

According to such a configuration, the optical signal return unit includes one component that is the tunable wavelength filter instead of the two components that are the filter and the gate unit of the optical signal return unit of claim 1 described above. Thus, the amount of resources in the device configuration can be reduced than in the burst beam relay device described in claim 2.

(5) There is provided a burst beam relay device including an optical signal return unit connected to a representative node with an active/auxiliary configuration that sends and receives a burst optical signal and sends a continuous-wave clamp beam with a wavelength different from a wavelength of the burst optical signal, via two optical transmission lines with a double-ring configuration that perform optical transmission in mutually opposite directions, in a manner relaying the burst optical signal and an optical signal of the clamp beam, the optical signal return unit being connected across the two optical transmission lines in each of a plurality of nodes that sends and receives the burst optical signal, in which the optical signal return unit includes a first isolator that passes an optical signal transmitted in a direction opposite to one of the optical transmission lines through another optical transmission line in the node, only in a transmission direction of the optical signal, a first optical coupler that branches the optical signal having passed through the first isolator, a second isolator that passes an optical signal transmitted through the one of the optical transmission lines in the node, only in a transmission direction of the optical signal, a second optical coupler connected to an output side of the optical signal of the second isolator, and a filter connected between the first optical coupler and the second optical coupler, the filter passes only the clamp beam branched by the first optical coupler, and the second optical coupler synthesizes the clamp beam having passed through the filter with a burst optical signal that has passed through the second isolator and that is to be sent to the representative node, and returns the synthesized signals to the one of the optical transmission lines.

According to such a configuration, the optical signal return unit can be configured with two isolators including the first and second isolators, two optical couplers including the first and second optical couplers, and one filter. Thus, the amount of resources can be significantly reduced than in the burst beam relay device described in claim 2.

Besides, the specific configurations can be changed as appropriate within the spirit and scope of the present invention.

REFERENCE SIGNS LIST

31 Representative node
31$a$ to 31$d$ Node
39$a$A to 39$d$A Burst beam relay device
41 Outer optical transmission line (One of optical transmission lines)
42 Inner optical transmission line (the other optical transmission line)
50$a$, 50$b$, 50$a$1, 50$b$1, 50$a$2, 50$b$2, 50$a$3, 50$b$3 Optical signal return unit
45$c$, 45$d$, 48$c$, 48$d$ EDFA
51$a$, 51$b$ Isolator
52$a$, 52$b$ Optical coupler
53 Filter
54 Gate unit
55$a$, 55$b$ Detection unit
57 T filter (tunable wavelength filter)

The invention claimed is:

1. A burst beam relay device comprising:
an optical signal return unit, including one or more processors, connected to a representative node with an active/auxiliary configuration configured to send and receive a burst optical signal and send a continuous-wave clamp beam with a wavelength different from a wavelength of the burst optical signal, via two optical transmission lines with a double-ring configuration configured to perform optical transmission in mutually opposite directions, in a manner relaying the burst optical signal and a continuous optical signal of the clamp beam, the optical signal return unit being connected across the two optical transmission lines in each of a plurality of nodes that sends and receives the burst optical signal; and a detection unit, including one or more processors, configured to, when an input optical signal via a first optical transmission line of the two optical transmission lines has not been detected for a predetermined time or longer, output a disconnection signal of the first optical transmission line to the optical signal return unit, wherein only when there is an input of the disconnection signal, the optical signal return unit is configured to return to the first optical transmission line only a clamp beam that has been sent from the representative node via another optical transmission line in a direction opposite to the input optical signal via the first optical transmission line.

2. The burst beam relay device according to claim 1, wherein:

the optical signal return unit includes a first isolator configured to pass a first optical signal transmitted through a second optical transmission line of the two optical transmission lines in the node in a direction opposite to the first optical transmission line, only in a transmission direction of the first optical signal, a first optical coupler configured to branch the first optical signal having passed through the first isolator, a second isolator configured to pass a second optical signal transmitted through the first optical transmission line in the node, only in a transmission direction of the second optical signal, a second optical coupler connected to an output side of the second optical signal of the second isolator, and a filter and a gate unit connected in a cascade arrangement between the first optical coupler and the second optical coupler;

the filter is configured to pass only the clamp beam branched by the first optical coupler; wherein the gate unit is configured to pass the clamp beam having passed through the filter only when there is an input of the disconnection signal; and the second optical coupler is configured to synthesize the clamp beam having passed through the gate unit with a burst optical signal that has passed through the second isolator and that is to be sent to the representative node, and return the synthesized signals to the one of the optical transmission lines.

3. The burst beam relay device according to claim 1, wherein:

the optical signal return unit includes a first optical coupler configured to branch a first optical signal transmitted through second optical transmission line of the two optical transmission lines in the node in a direction opposite to the first optical transmission line, an isolator configured to pass a second optical signal transmitted through the first optical transmission line in the node, only in a transmission direction of the second optical signal, a second optical coupler connected to an output side of the second optical signal of the isolator, and a filter and a gate unit connected in a cascade arrangement between the first optical coupler and the second optical coupler;

the filter is configured to transmit only the clamp beam branched by the first optical coupler;

the gate unit is configured to pass the clamp beam having passed through the filter only when there is an input of the disconnection signal; and the second optical coupler is configured to synthesize the clamp beam having passed through the gate unit with a burst optical signal that has passed through the isolator and that is to be sent to the representative node, and return the synthesized signals to the first optical transmission line.

4. The burst beam relay device according to claim 1, wherein:

the optical signal return unit includes a first isolator configured to pass a first optical signal transmitted through a second optical transmission line of the two optical transmission lines in the node in a direction opposite to the first optical transmission line, only in a transmission direction of the first optical signal, a first optical coupler configured to branch the first optical signal having passed through the first isolator, a second isolator configured to pass a second optical signal transmitted through the first optical transmission line in the node, only in a transmission direction of the second optical signal, a second optical coupler connected to an output side of the second optical signal of the second isolator, and a tunable wavelength filter connected between the first optical coupler and the second optical coupler and having a variable pass band for an optical signal;

the tunable wavelength filter is configured to pass only the clamp beam when there is an input of the disconnection signal; and the second optical coupler is configured to synthesize the clamp beam having passed through the tunable wavelength filter with a burst optical signal that has passed through the second isolator and that is to be sent to the representative node, and return the synthesized signals to the one of the optical transmission lines.

5. A burst beam relay device comprising:

an optical signal return unit, including one or more processors, connected to a representative node with an active/auxiliary configuration configured to send and receive a burst optical signal and send a continuous-wave clamp beam with a wavelength different from a wavelength of the burst optical signal, via two optical transmission lines with a double-ring configuration that perform optical transmission in mutually opposite directions, in a manner relaying the burst optical signal and a continuous optical signal of the clamp beam, the optical signal return unit being connected across the two optical transmission lines in each of a plurality of nodes that sends and receives the burst optical signal, wherein:

the optical signal return unit includes a first isolator configured to pass a first optical signal transmitted in a direction opposite to a first of the two transmission lines through a second of the two optical transmission lines in the node, only in a transmission direction of the first optical signal, a first optical coupler configured to branch the first optical signal having passed through the first isolator, a second isolator configured to pass a second optical signal transmitted through the first optical transmission line in the node, only in a transmission direction of the second optical signal, a second optical coupler connected to an output side of the second optical signal of the second isolator, and a filter connected between the first optical coupler and the second optical coupler; wherein the filter is configured to pass only the clamp beam branched by the first optical coupler; and the second optical coupler is configured to synthesize the clamp beam having passed through the filter with a burst optical signal that has passed through the second isolator and that is to be sent to the representative node, and return the synthesized signals to the one of the optical transmission lines.

6. A burst beam relay method performed with a burst beam relay device connected to a representative node with an active/auxiliary configuration configured to send and receive a burst optical signal and send a continuous-wave clamp beam with a wavelength different from a wavelength of the burst optical signal, via two optical transmission lines with a double-ring configuration that perform optical transmission in mutually opposite directions, in a manner relaying the burst optical signal and a continuous optical signal of the clamp beam, the burst beam relay device being arranged in each of a plurality of nodes that sends and receives the burst optical signal, the method comprising the following steps performed by the burst beam relay device:

a step of, when an input optical signal via a first of the two optical transmission lines has not been detected for a predetermined time or longer, outputting a disconnection signal of the first optical transmission line; and a step of, only when there is an input of the disconnection signal, returning to the first optical transmission line only a clamp beam that has been sent from the representative node via a second optical transmission line in a direction opposite to the input optical signal via the first optical transmission line.

7. The burst beam relay method according to claim 6, further comprising:

passing, by a first isolator, a first optical signal transmitted through the second optical transmission line in the node in a direction opposite to the first optical transmission line only in a transmission direction of the first optical signal, branching, by a first optical coupler, the first optical signal having passed through the first isolator, passing, by a second isolator, a second optical signal transmitted through the first optical transmission line in the node, only in a transmission direction of the second optical signal, passing, by a filter, only the clamp beam branched by the first optical coupler;

passing, by a gate unit, the clamp beam having passed through the filter only when there is an input of the disconnection signal; and synthesizing, by a second optical coupler, the clamp beam having passed through the gate unit with a burst optical signal that has passed through the second isolator and that is to be sent to the representative node, and returns the synthesized signals to the one of the optical transmission lines.

8. The burst beam relay method according to claim 6, further comprising:

branching, by a first optical coupler, a first optical signal transmitted through the second optical transmission line in the node in a direction opposite to the first optical transmission line passing, by an isolator, a second optical signal transmitted through the first optical transmission line in the node, only in a transmission direction of the second optical signal, transmitting, by a filter, only the clamp beam branched by the first optical coupler;

passing, by a gate unit, the clamp beam having passed through the filter only when there is an input of the disconnection signal; and synthesizing, by a second optical coupler, the clamp beam having passed through the gate unit with a burst optical signal that has passed through the isolator and that is to be sent to the representative node, and returns the synthesized signals to the one of the optical transmission lines.

9. The burst beam relay method according to claim 6, further comprising:

passing, by a first isolator, a first optical signal transmitted through the second optical transmission line in the node in a direction opposite to the first optical transmission line, only in a transmission direction of the first optical signal, branching, by a first optical coupler, the first optical signal having passed through the first isolator, passing, by a second isolator, a second optical signal transmitted through the first optical transmission line in the node, only in a transmission direction of the second optical signal, passing, by a tunable wavelength filter, only the clamp beam when there is an input of the disconnection signal; and synthesizing, by a second optical coupler, the clamp beam having passed through the tunable wavelength filter with a burst optical signal that has passed through the second isolator and that is to be sent to the representative node, and returns the synthesized signals to the one of the optical transmission lines.

* * * * *